United States Patent [19]

Habbe et al.

[11] Patent Number: 5,655,071
[45] Date of Patent: Aug. 5, 1997

[54] METHOD AND A SYSTEM FOR DISTRIBUTED SUPERVISION OF HARDWARE

[75] Inventors: Ingemar Habbe, Gnesia, Sweden; Andrew Simmonds, Victoria, Australia; Stefan Wahlman, Kista, Sweden; Ricardo Giscombe, Nacka, Sweden; Magnus Lennartsson, Skogås, Sweden; Per Einar Strömme, Enskede, Sweden

[73] Assignee: Telefonaktiebolaget LM Ericsson, Stockholm, Sweden

[21] Appl. No.: 417,021

[22] Filed: Apr. 5, 1995

[30] Foreign Application Priority Data

Apr. 8, 1994 [SE] Sweden .................... 9401185

[51] Int. Cl.$^6$ .................................... G06F 11/00
[52] U.S. Cl. ................. 395/183.01; 395/183.07; 395/22; 395/26; 364/282.4; 364/280.6
[58] Field of Search .......... 395/183.01, 183.02, 395/183.07, 22, 26, 50; 364/282.4, 280.6

[56] References Cited

U.S. PATENT DOCUMENTS

| | | | |
|---|---|---|---|
| 3,988,579 | 10/1976 | Bottard | 395/183.01 |
| 4,354,267 | 10/1982 | Mori et al. | 371/11 |
| 4,354,270 | 10/1982 | Nuding | 371/68 |
| 4,627,055 | 12/1986 | Mori et al. | 371/16 |
| 5,127,006 | 6/1992 | Subramanian | 395/183.02 |
| 5,157,668 | 10/1992 | Buenzli, Jr. | 395/183.02 |
| 5,309,448 | 5/1994 | Bouloutas | 371/29.1 |
| 5,404,503 | 4/1995 | Hill | 395/183.02 X |
| 5,408,218 | 4/1995 | Suedberg | 340/507 |
| 5,412,753 | 5/1995 | Alston | 395/12 |

FOREIGN PATENT DOCUMENTS

| | | |
|---|---|---|
| 139 069 | 5/1985 | European Pat. Off. . |
| 549 409 | 6/1993 | European Pat. Off. . |
| WO92/17961 | 10/1992 | WIPO . |

OTHER PUBLICATIONS

F. Halsall, *Data Communications, Computer Networks and OSI*, 2d. ed., pp. 98–103, Addison–Wesley Publ. Co. (1988).
S.B. Lippman, *C++ Primer*, 2d. ed., chapts. 0, 2, Addison–Wesley Publ. Co. (1991).
K. Mori et al., "Autonomous Decentralized Loop Network," IEEE Computer Society International Conference, vol. 24, pp. 192–195 (Feb. 1982).
CCITT Draft Recommendation I.432, "B–ISDN User Network Interface—Physical Layer Specification," pp. 127–142.

*Primary Examiner*—Robert W. Beausoliel, Jr.
*Assistant Examiner*—Dieu-Minh Le
*Attorney, Agent, or Firm*—Burns, Doane, Swecker & Mathis, L.L.P.

[57] ABSTRACT

In a telecommunication system, a fault supervision and management system includes a chain system of diagnose and inference objects connected one after another in a fault propagation direction. The locations of these objects are determined so as to enable them to supervise, in a supervision domain, one phenomenon each, which may be caused by faults in the telecommunication system. The objects are further located so as to enable them to communicate with, affect, and interact with each other in case of the emergence of a fault, for localizing faults in the telecommunication system. Each diagnose and inference object uses one or more measurement point objects for observing the emergence of the phenomenon supervised by the diagnose and inference object and for reporting to the diagnose and inference object. Several measurement point objects may be grouped in a measurement combinatory object which puts together and processes data from measurement point objects.

23 Claims, 13 Drawing Sheets a) • Inference Point (IFP)
b) • Fault Termination Inference Point (FTIFP)
c) —— Influence Connection
d) ⌐— Start of Influence Chain coordinateIFP (faultyID)

clearFaultIFP (recoveredID)

| No | INPUT | PRECON-DITION | OUTPUT | POSTCONDITION |
|---|---|---|---|---|
| 1 | localizeIFP(IFPid) | P1 AND P2 | notFaultyIFP(req-IFPid,sending-IFPid) | NOT SPECIFIED |
| 2 | localizeIFP(IFPid) | P3 OR P4 | coordinateIFP-(IFPid) | NOT SPECIFIED |
| 3 | NONE | P4 | coordinateIFP-(IFPid) | The Client IFP sends coordinateIFP(IFPid) to IFP downstream |
| 4 | NONE | P5 | clearFaultIFP-(IFPid) | The Client IFP sends clearFaultIFP(IFPid) to IFP downstream |

FIG. 25

| No | INPUT | STATE | OUTPUT | POSTSTATE |
|---|---|---|---|---|
| 1 | startMeasurement | NOT ACTIVE | retrievedSamples | ACTIVE |
| 2 | stopMeasurement | NOT ACTIVE | NONE | NOT ACTIVE |
| 3 | startMeasurement | ACTIVE | retrievedSamples | ACTIVE |
| 4 | stopMeasurement | ACTIVE | NONE | NOT ACTIVE |

FIG. 27

| No | INPUT | STATE | PRECON-DITION | OUTPUT | POSTSTATE |
|---|---|---|---|---|---|
| 1 | startIFPdiagnose With diagnoseType ==lookingForError | NOT ACTIVE | P1 | errorDetected | ACTIVE |
| 2 | startIFPdiagnose With diagnoseType ==lookingForError | NOT ACTIVE | NOT P1 | NONE | ACTIVE |
| 3 | startIFPdiagnose With diagnoseType ==lookingForRecovery | NOT ACTIVE | P1 | NONE | ACTIVE |
| 4 | startIFPdiagnose With diagnoseType ==lookingForRecovery | NOT ACTIVE | NOT P1 | noErrorDetected | ACTIVE |
| 5 | stopIFPdiagnose | NOT ACTIVE | NONE | NONE | NOT ACTIVE |
| 6 | doIFPdiagnose | NOT ACTIVE | P1 | errorDetected | NOT ACTIVE |
| 7 | doIFPdiagnose | NOT ACTIVE | NOT P1 | noErrorDetected | NOT ACTIVE |
| 8 | startIFPdiagnose With diagnoseType ==lookingForError | ACTIVE | P1 | errorDetected | ACTIVE |
| 9 | startIFPdiagnose With diagnoseType ==lookingForError | ACTIVE | NOT P1 | NONE | ACTIVE |
| 10 | startIFPdiagnose With diagnoseType ==lookingForRecovery | ACTIVE | P1 | NONE | ACTIVE |
| 11 | startIFPdiagnose With diagnoseType ==lookingForRecovery | ACTIVE | NOT P1 | noErrorDetected | ACTIVE |
| 12 | startIFPdiagnose With diagnoseType ==lookingForError | ACTIVE | NOT P1 | NONE | ACTIVE |
| 13 | stopIFPdiagnose | ACTIVE | NONE | NONE | NOT ACTIVE |
| 14 | doIFPdiagnose | ACTIVE | P1 | errorDetected | ACTIVE |
| 15 | doIFPdiagnose | ACTIVE | NOT P1 | noErrorDetected | ACTIVE |

FIG. 26

METHOD AND A SYSTEM FOR DISTRIBUTED SUPERVISION OF HARDWARE

BACKGROUND

The present invention relates generally to management of complex hardware and software in a telecommunication system, in particular supervision of such hardware and software.

More particularly, the invention relates to a fault supervision and fault management system, and a method for distributed fault management in a telecommunication system.

It is a well known fact that complex hardware and software systems are difficult to supervise in a correct way. Most systems use centralized solutions with a centralized analysing software block for the supervision. This analysing block becomes great and complex, also for systems with a moderate degree of complexity. In case of introducing new hardware and software and changing an old one in such a system, it is often difficult to update the model and the methods according to the new hardware and software.

WO 92/17961 relates to an adaptive distributed system for fault tolerance. The system includes a network with at least three nodes, each communicating with at least one other node. Each node is arranged to test whether another node takes a desired or undesired state. It is possible to determine whether N nodes, wherein N is an integer greater than or equal to 3, has a desired or undesired state. If a tested node has a desired state it is activated to become a testing node. If an undesired test result is obtained the above procedure is repeated for other nodes until a processor with a desired state has been tested. The diagnosis information is forwarded along paths in the network.

EP 139,069 describes a fault diagnosing distributed system with a plurality of mutually interconnected subsystems on a common level, each subsystem having a function to diagnose faults in other subsystems and protect its own subsystem based upon the result of diagnosis of the faults of the other subsystems.

U.S. Pat. No. 4,627,055 shows a decentralized system with a plurality of subsystems of the same type which are interconnected. Each subsystem has diagnosing means for diagnosing faults in other subsystems and functions for taking measures in response to diagnosis results.

U.S. Pat. No. 4,354,267 is related to fault handling where the aim is to avoid disadvantages when using an extensive "master transmission control unit".

SUMMARY

A general object of the invention is to provide a model and methods applied on this model for designing and implementing fault handling in telecommunication systems with complex hardware and software.

More particularly, the model shall serve as a representation in software of the fault behaviour of telecommunication equipments. By observing supervised entities and by using knowledge of the behaviour of the entitites, the model shall be able to detect, identify and localize faults in different abstraction levels and views, and be able to be used for coordinating alarms from different fault detecting entities. It is desirable that the model also shall be able to be used for resetting (automatically or manually) a faulty unit.

In accordance with the invention the above has been attained by the fault supervision and fault handling system according to the invention including a chain system of diagnose and inference data entities interconnected one after the other in a fault propagation direction in the telecommunication system, the location of said data entities in the chain system being determined so as to enable each of them to supervise, in a respective supervision domain, one phenomenon each, which may be caused by faults in the telecommunication system, and to communicate with, affect and interact with each other in case of emergence of a fault, for localizing faults in the telecommunication system.

According to a preferred embodiment each diagnose and inference data entity uses one or more measurement point data entities for observing the emergence of the phenomenon supervised by the diagnose and inference data entity, and reporting to the diagnose and inference data entity.

The method according to the invention for distributed fault handling in a telecommunication system, comprises the steps of analysing flows of data and signals in the system for determining the behaviour of the system in case of fault emergence and thereby localizing phenomenons which can be caused by faults, representing said behaviour by one or more chain systems of diagnose and inference data entities interconnected one after the other in a fault propagation direction in the telecommunication system, while determining the location of data entities in their respective chain system so as to enable each of them to supervise, in a respective supervision domain, one each of those of said phenomenons which may appear in such chain system, and to communicate with, affect and interact with each other in case of emergence of a fault, for localizing faults in the telecommunication system, providing one or more measurement point data entities in association with each diagnose and inference data entity for observing the emergence of the phenomenon supervised by the associated diagnose and inference data entity, and reporting to the diagnose and inference data entity.

Several measurement point data entities may advantageously be grouped to a measurement combinatory data entity which collects and processes data from the measurement point data entities included therein.

According to a further embodiment a diagnose and inference data entity that has detected the presence of a fault in its corresponding chain system, before having established whether the fault has arisen in its own supervision domain, sends a fault localize request to diagnose and inference data entities located before this fault detecting data entity in said chain system, as seen in the fault propagation direction, requesting them to send in return an acknowledgement message as to whether also they have detected a fault or not.

The search for faults in other diagnose and inference data entities preferably continues until a diagnose and inference data entity has been found which either constitutes a start of the chain system in question, or also has detected a fault.

If the current chain system includes more parallel branches before the fault detecting diagnose and inference data entity, search is performed in one branch at a time.

It is preferred that the fault localize request includes an identity parameter identifying its origin.

The acknowledgement message may contain two identifying parameters, one identifying the origin of the fault localize request and one identifying the sender.

Each diagnose and inference data entity may have a fault sequence number associated therewith, which is stepped up by one when a fault has been detected by the associated diagnose and inference data entity, said sequence number being introduced as a parameter in the fault localize request and being stored together with the identity of an associated fault localize requesting diagnose and inference data entity along the associated chain system, the stored information forming an indication that upstream branches have already been investigated and that acknowledgement can be sent downstream immediately.

If a chain system includes several parallel branches for the fault detecting diagnose and inference data entity, search is performed in parallel in upstream branches, and information regarding the branch having been passed by the request is added to a parameter list for the fault localize request.

The parameters may then preferably be implemented as a stack to which each diagnose and inference data entity sending a localize request adds its own identity.

The sending diagnose and inference data entity may keep track of outstanding localize requests by means of a counter and by saving the identity of the request.

Before an acknowledgement message is returned, the acknowledgement messages in each upstream branch should preferably have been received.

The identity parameter may be returned by the acknowledgement message.

Each time an acknowledgement is sent, an updating operation should preferably be performed on the stack.

According to a further preferred embodiment a diagnose and inference data entity, as soon as having established that a detected fault is within its domain, sends a coordination method call to all diagnose and inference data entities located downstream in the fault propagation direction, said method call being passed on until a fault terminating diagnose and inference data entity has been found.

Preferably the identity of the sending diagnose and inference data entity follows the coordination method call and is stored by diagnose and inference data entities being passed by the call.

When a fault has been taken care of, the disappearance of the fault is detected by the diagnose and inference data entity that originally detected the fault, said data entity sending a method call about this to all downstream diagnose and inference data entities, said method call being passed on until a fault terminating diagnose and inference data entity has been found.

The identity of the diagnose and inference data entity in question preferably follows the message regarding the disappearance of the fault.

When a diagnose and inference data entity has received the message regarding the disappearance of the fault, this data entity starts supervision of faults again, after that all diagnose and inference data entities having caused the taking out of operation of this diagnose and inference data entity, have recovered.

Expressed in another way, there is created according to the invention a model for performing the method, that includes submodels of the behaviour of real hardware and software entities, as well as of the behaviour of the more abstract entities which may be implemented in a telecommunication system. As an example there can be mentioned logical functions representing a certain implementation in hardware and software. The model also contains submodels of that which further on will be denominated replaceable entities and entities related thereto. More particularly, by a replaceable entity is here meant the smallest hardware part that can be replaced, normally a single board or a single cable. This part of the model is used for activities aiming at taking measures in case of faults, an activity which will be denominated repair handling below.

The need of communication between models representing different telecommunication systems is inherent in the model.

The part methods for fault supervision, included in the method according to the invention, are based upon a distributed approach to the problem. With this approach a centralized analysing software block according to the state of the art will be unnecessary.

Different objects in the model used have strictly specified and well defined tasks, such as observation of a supervised entity, symptom generation, i.e. assembling and processing observations, diagnosing/analysing an observed entity or entities, and finally state propagation between different analysing entities. This will make it easy to build well structured models of the supervised system.

A graphical notation representing the behaviour of the supervised entities with respect to the propagation of how a fault is manifested, is included in the invention. A change of the hardware and software implementation will result in changes in graphs representing the hardware and software. This implies that changes may be performed in a rather simple and structured way.

The distributed approach together with the graphical notation makes it easier to understand how different faults influence each other and how a particular fault is manifested.

The methods of the invention, i.e. the concepts and the graphical notation, may also be used in connection with design of hardware and software. This helps the hardware and software designer to attain a good knowledge of fault density and fault propagation in current hardware and software design, as well as possible fault detection degree, and to optimize indication of faulty replaceable units. Furthermore it is very simple to generate and implement the software model from the documentation of the hardware and software design.

The observing and symptom generating part of the model according to the invention may be re-used for performance calculation functions in a telecommunication system.

The hardware and software supervision model may be used recursively, i.e. the mechanism used for the hardware and software supervision is likewise supervised by the model. As an example the supervision of hardware and software is used for performing observations in the hardware and software supervision.

The model may be generalized so as to be valid for all types of hardware and software systems.

BRIEF DESCRIPTION OF THE DRAWINGS

The invention will now be described more closely below with reference to the attached drawings, on which FIG. 1 schematically and in block diagram form shows a data processing system, an embodiment of the invention included therein being also illustrated, FIG. 2 schematically illustrates a software model for fault handling, FIGS. 25-27 are tables showing state transitions in each an interface included in FIG. 5.

DETAILED DESCRIPTION

The embodiments of the invention which will be described below are based, for the sake of simplicity, on the presumption that there is the question of an object oriented distributed data system. However, and more generally, the invention are not limited to this type of system but can also be applied to other types of systems which are designed for using data entities of another character than objects.

For expressions appearing below and on the drawings in connection with description of signals including messages and method calls, as well as of participating actors, conventional naming rules for structured programming are used, of the kind which are e.g. described in the book "C++ Primer" by Stanley B. Lippman, 2nd Edition, Addison-Wesley Publishing Company. A closer description of the expressions in question and their meaning will be given below with reference to FIG. 5.

The embodiments of the invention described below are furthermore, for the sake of simplicity, mainly directed to supervision of hardware. The invention is, however, also applicable to software supervision, as will be described below in some cases.

Figure 1:
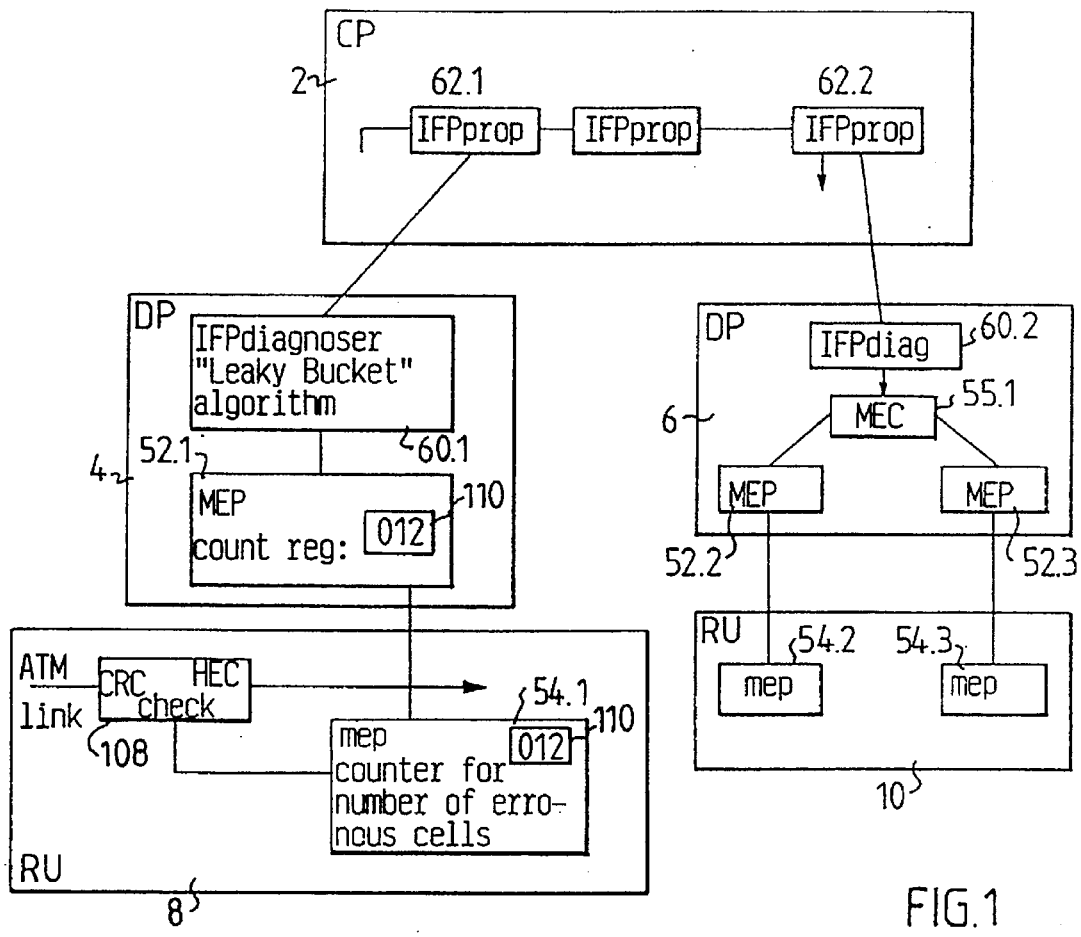

FIG. 1 shows schematically and as an example, part of a data processing system as including a central processor CP, designated 2, and local processors DP connected thereto and designated 4 and 6, respectively. The application of the fault handling model on such a system will be described more closely below.

The fault handling model according to the invention generally consists of three rather independent submodels. This partition of the model reflects the main tasks that the fault handling takes care of, viz.:

Supervision of hardware, such as in the processors 2, 4 and 6. This part is used for detecting a fault, identifying the type of fault and localizing the origin of the fault in the hardware, wherein one or more faulty units, replaceable units and/or function units, may be indicated as faulty. This part of the model is below also denominated "hardware supervision model". Replaceable units, of which two are shown at 8 and 10, respectively, in FIG. 1, and are assumed to be included in the processors 4 and 6, respectively, are intended in the present connection to be the smallest part of hardware which is replaceable, normally a single board or a single cable.

Fault. coordination of functions or analysis of functions with respect to the fault behaviour. This activity is started when a fault has been detected and one or more functions have been indicated as faulty. The analysis of the effect of a fault on the functions is made by and between the functions themselves. Below this part of the model is also denominated "fault handling model on a function level".

Repair handling. This activity is started when a replaceable unit has been indicated as faulty by the hardware supervision. Below this part of the model is also denominated "repair handling model".

Figure 2:
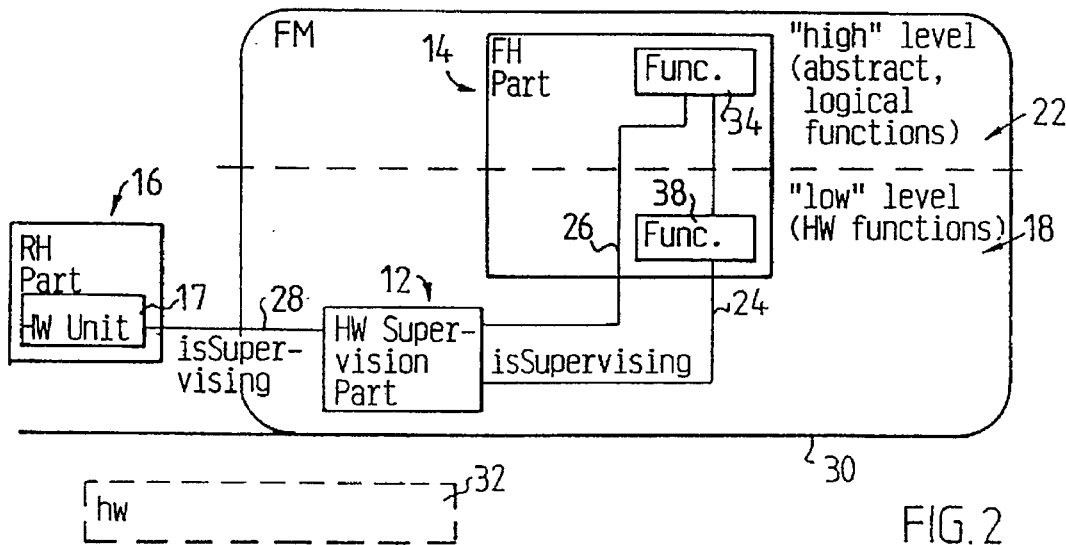

This partition of the model may also be mapped on different abstraction levels according to FIG. 2, where the hardware supervision part is designated 12, the fault handling part FH on a function level is designated 14, and the repair handling part RH is designated 16. The latter is shown as including a submodel 17 of a hardware unit. The levels in question are indicated in the Figure as e.g. including a "low" level 18 for hardware dependent functions, and a "high" level 22 for abstract logical functions.

More particularly, the supervision of the hardware, indicated with arrows 24, 26, 28, is of course dependent on the hardware implementation. This part of the model may be found on level 18 and can partly be implemented in the local processors 4 and 6. The part responsive for the analysis of fault influence by the functions may be found on abstraction levels 18 and 22. Each system, or subsystem, must build its own model by the two parts 12 and 14 of the model.

The last part 16, the repair handling model, is created by objects discussed more closely below and representing the replaceable units, such as 8 and 10. The repair handling part 16 also affects the entities in the other two parts of the model. The repair handling model may be common to several systems or subsystems, as the systems may be implemented on one and the same replaceable unit.

In FIG. 2 there is furthermore indicated a hardware interface at 30 and a physical counterpart to the hardware model 17 with a dashed block 32. At 34 and 38 functional models are furthermore indicated.

If the observed measurement point as an alternative would be located in the software, e.g. be a fault counter in the software, parts 16 and 17 in FIG. 2 disappear, the part 12 is replaced by a software supervision part, and the hardware interface 30 is replaced by a software interface.

As will likewise appear from below, models representing different systems or subsystems may communicate with each other by propagating states between objects in the different models. There is no difference between communicating between different models or within a model.

Figure 3:
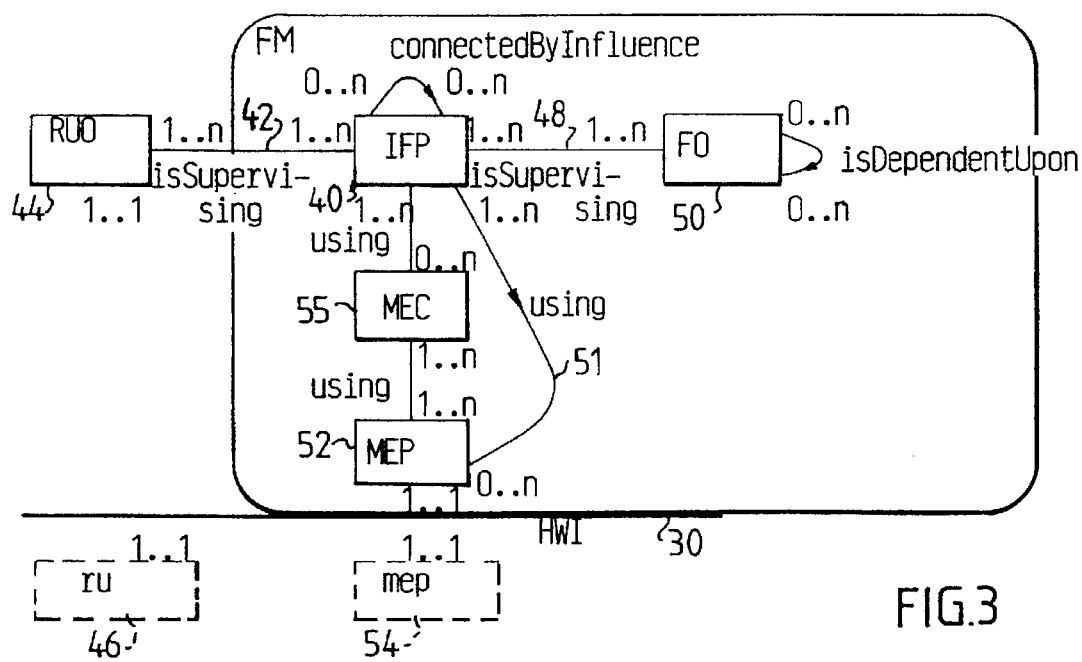
FIG. 3 shows a model of object entity relations in connection with fault handling and repair handling of an apparatus.

FIG. 3 shows an object relation model of the fault handling and repair handling for a device. The model includes a number of diagnosis and inference point objects. Of these one is shown at 40 in FIG. 3. Shortly, these objects will be identified below as inference points, or IFP. Such an inference point IFP is responsive for the supervision of a specified part of a data or a signal flow.

Indicated by an arrow 42 in FIG. 3, the inference point IFP 40 supervises a replaceable unit object 44, henceforth also called RUO, representing a replaceable unit 46, henceforth also called ru, shown by dashed lines. As indicated with an arrow 48, the inference point IFP 40 furthermore supervises a function object 50, henceforth also called FO. By function object FO is here meant a software representation of a function which is implemented by one or more systems.

The inference point IFP 40 uses, indicated by arrow 51, for its function a number of measurement point objects, henceforth also called MEP (Measurement Point), of which one is shown at 52 in FIG. 3 and three are shown with dashed lines at 52.1, 52.2 and 52.3, respectively, in the local processors 4 and 6 in FIG. 1. Each such object MEP corresponds to a physical entity 54, henceforth also called mep, three of these being shown in FIG. 1 at 54.1, 54.2 and 54.3, respectively, in RU 8 and RU 10.

Henceforth the measurement point objects MEP may be denominated measurement point MEP in short. In the present connection a measurement point is intended to mean a representation of a fictitious point where the observation of the observed entity is done. This measurement point MEP also includes the method used for the observation.

A MEP interacts with the hardware for observing possible state changes. The methods for detecting hardware faults is in some cases very dependent on the implementation of the hardware. Due to the intimate relation to the hardware, MEP is often, but not necessarily always, distributed to a current local processor, as has just been described with reference to FIG. 1.

Before publication of an observation a lot of data processing of the observed entity mep may have been done. The measurement result published in a measurement point MEP can be a counter value, a data processed counter value, or any other hardware or software signal. However, the measurement point MEP neither analyses nor draws any conclusions about the observed entity mep.

If necessary, the measurement point MEP may also be adjusted by the software. One example is putting a threshold value for a used method.

If suitable, observations from different measurement points MEP may be combined to a measurement combinatory object 55, henceforth also denominated MEC (Measurement Combinatory object), which is likewise used by the inference point IFP 40. In FIG. 1 there is shown a MEC at 55.1 in the local processor 6. The output from a measurement combinatory object MEC may be seen as a symptom of observed entities in the hardware. As is the case for the measurement point the measurement combinatory object MEC does never analyse any data. The measurement combinatory object MEC may however put together and process data from its included measurement points MEP. This processing most often is performed in software. The "refined observation", the symptom, is left for further analysis.

The measurement combinatory object MEC can wholly or partially be implemented in software of a local processor, such as 4 and 6 in FIG. 1, on the assumption that the used observations are available in the appropriate processor, i.e. the used measurement point MEP must be located at the same processor as the measurement combinatory object MEC.

Based upon observations from MEPs and/or MEC, an IFP puts a diagnosis regarding a certain hardware by analysing observations and deciding whether a fault has been detected.

Besides analysing fault symptoms, the IFPs are also responsible for fault localization. It is important to be able to localize the real cause of the fault so as to be able to point to the right replaceable unit. Since hardware faults may be detected by several IFPs, there must be a method for deciding which IFP that has detected the origin of the fault.

A great hardware fault affects a number of different IFPs. A faulty system clock may e.g. imply that IFPs supervising a flow of cells in a cell switch detect faults. To be able to localize the origin of the fault, the IFPs must be conscious of each other. They must be mutually arranged in a determined order in a way that it will appear which IFP that can be influenced by another IFP.

The fault localization may be performed by putting all IFPs that can influence each other, in an influence chain. An IFP that can influence all of the others, should be placed so as to be located most upstream, whereafter the other IFPs may be placed after influence order. The IFP located most downstream cannot influence any other one.

Figure 4:
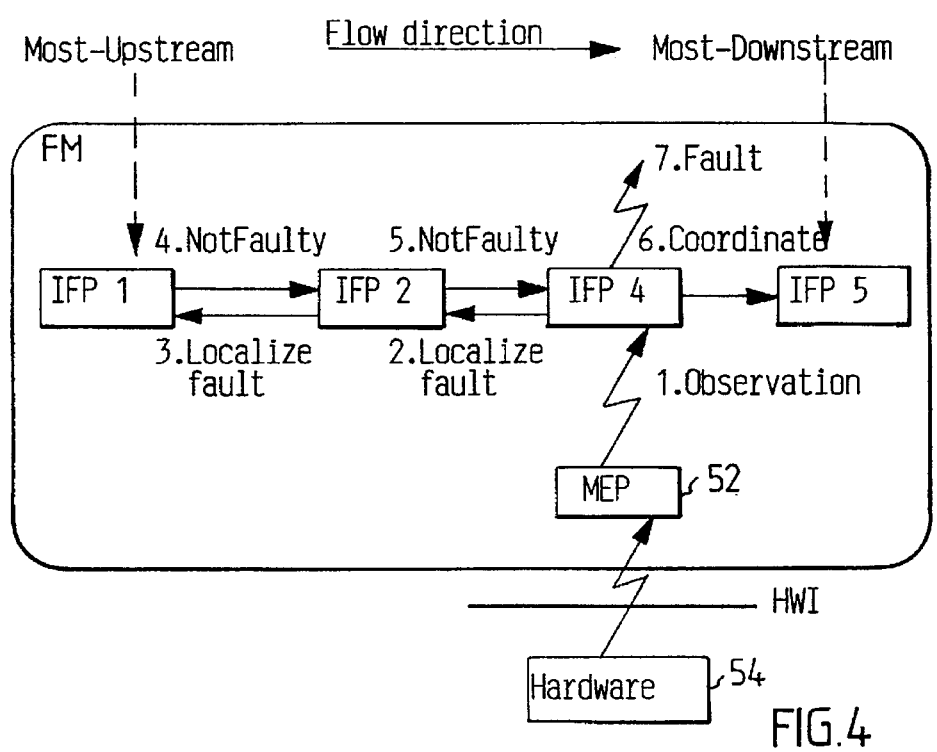
FIG. 4 is an influence diagram illustrating the principles of fault localization, FIG. 5 schematically illustrates the design of a diagnosis and inference point object with appurtenant received and sent method calls, and inner and outer interfaces.

The principles of fault localization are illustrated by the influence diagram shown in FIG. 4. In the diagram $IFP_1$ and $IFP_5$ are the most upstream and downstream located IFPs, respectively, in accordance with the above description, whereas $IFP_2$ and $IFP_4$ are located therebetween in order of influence. In FIG. 4 the respective steps of the fault localization are enumerated 1–7.

Based upon observation, step 1, from MEP 52, $IFP_4$ makes a diagnosis regarding a certain hardware 54 by analysing the observation and decides that a fault has been detected. $IFP_4$ therefore directs, step 2, a request for fault localization, 'Localize fault', to the nearest upstream located IFP, viz. $IFP_2$. The fault localize request is forwarded to the most upstream IFP, i.e. $IFP_1$, step 3. $IFP_1$ and $IFP_2$ respond to the localize request, steps 4 and 5, the answer in this case being 'Not Faulty'. When $IFP_4$ receives this response from the upstream IFPs the localization procedure is over and the origin of the fault has been found, viz. the hardware supervised by $IFP_4$ itself.

In order to avoid unnecessary fault propagation when the origin of the fault has been found, the IFP that detected the fault as belonging to its own supervision domain, i.e. $IFP_4$, sends an instruction, by 'Coordinate' in step 6, to the downstream located IFPs, in this case $IFP_5$, to take a rest position.

It should be added that the above described fault localization procedure is very simplified. The influence chains may be complicated and form very complex networks, as will appear below further on.

The fault localization and fault coordination is very dependent upon the behaviour of the hardware from a fault propagation point of view. This will be described more closely below.

Before a software model of the behaviour of the hardware, as seen from a fault propagation point of view, may be built, the flow of data and signals in the hardware must be analysed and be clearly understood. From these flows, submodels are created and they are supervised by the hardware supervision part of the model.

As has appeared from the description above with reference to FIG. 4 the behaviour of the data or signal flow is represented by a chain of interconnected inference points IFP. These connections are determined by the behaviour of the flow with reference to propagation of the manifestation of the fault, and are used at localization of a fault detecting inference point IFP. Inference points IFP in the same chain must have fault influence on each other. The reason for putting an inference point IFP in a certain influence chain is that if this introduced inference point detects a fault, some inference point located earlier in the chain may detect the same fault. The inference points IFP in a chain measure, however, not the same thing, but they can detect the same real hardware fault. If a fault appears in the hardware this may thus be detected by several inference points IFP, and all these inference points must be included in the same influence chain.

Even if the inference points IFP in a chain are able to detect the same hardware fault, all inference points need not, as a matter of fact, detect the fault, since the inference points search the fault from different points of view, as they, as mentioned, do not measure the same thing.

An inference point IFP in which fault manifestations are terminated, such as $IFP_4$ in FIG. 4, is denominated fault terminating inference point. A fault manifestation cannot be propagated beyond such a point, and the influence chain is thus ended.

Figure 5:
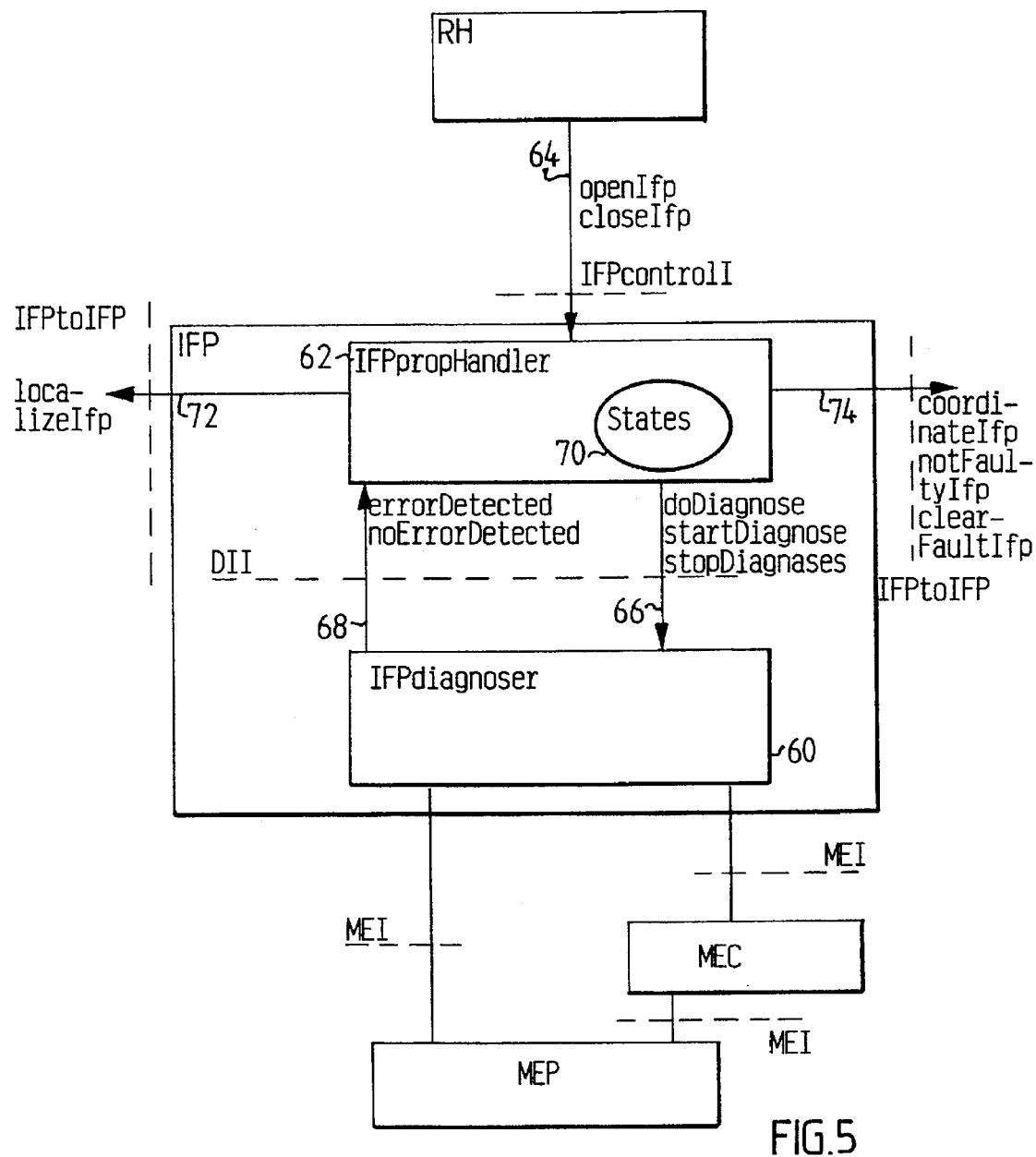

For obtaining a better understanding of the description below of influence chains and their function with reference to FIG. 7 and the following Figures, the design of an inference point IFP, its different states, and the method calls it sends and receives shall be described more closely with reference to FIGS. 5 and 6.

An inference point IFP contains a diagnosis part 60, 'IFPdiagnoser', below and in the drawings also being shortened as 'IFPdiag', intended for analysing and diagnosing observations and symptoms regarding an observed entity. In the case of fault handling, analysing and diagnosing is performed with regard to faults, i.e. the inference point IFP is responsive for detection and identification of faults in the hardware. It is up to the inference point IFP to decide whether it has detected a fault or not. An inference point IFP has the task of detecting and identifying one single type of fault.

When an inference point IFP has detected and identified a fault there still remains the task of localizing the origin of the fault to a correct inference point. It is not quite sure that the fault originates from the inference point IFP in which the fault has been detected. The manifestation of the fault may have been caused by some other fault anywhere else. A correct localization of the fault is very important when a replaceable unit RU and the functions in question shall be identified as faulty.

When the origin of the fault has been localized to a certain inference point IFP the fault must be coordinated with other fault detecting inference points IFP for avoiding unnecessary state propagation between the inference points.

The inference point IFP has an interacting and state propagating part 62, 'IFPpropHandler', below and on the drawings also shortened as 'IFPprop', which admits that inference points can interact with each other provided that the faults which they can identify depend upon each other. This is necessary when the fault detecting inference point responsive for the domain in which the fault has arisen, shall be localized, i.e. it must be possible to indicate the right replaceable unit.

The interacting and state propagating part 62 is put into or taken out of operation by the instructions openIFP and closeIFP, respectively, according to an arrow 64, from the repair handling model part RH, cf. FIG. 2, via an interface IFPcontrolI described more closely below.

The analysing and diagnosing part 60 of an inference point may be completely or partly implemented in software of a local processor, such as processors 4 and 6 in FIG. 1, provided that the used observations and symptoms are available in the right processor. The interacting state propagating part 62 of the object is, however, always implemented in a superior computer system such as the central processor 2 in FIG. 1. This is also illustrated in FIG. 1 wherein the analysing and diagnosing parts IFPdiag 60.1 and 60.2 of each an inference point are located in the local processors 4 and 6, respectively, and the corresponding state propagating parts IFPprop 62.1 and 62.2, respectively, are located in the central processor 2. There it also appears that IFPdiag 60.1 uses MEP 52.1 and that IFPdiag 60.2 uses MEC 55.1, which use the two MEPs 52.2 and 52.3.

From the interacting state propagating part 62 towards the diagnosing part, according to arrow 66, instructions are given for making a diagnosis, starting continous diagnosing, and stopping a proceeding diagnosing by the method calls doDiagnose, startDiagnose and stopDiagnose, respectively. In the opposite direction, according to arrow 68, information messages are given with respect to whether a fault has been detected or not, by errorDetected and noErrorDetected, respectively. The communication between IFPpropHandler 62 and IFpdiagnoser 60 is performed via an interface DII described more closely below. In FIG. 5 also interfaces IFPtoIFP are shown, via which the communication with other IFPs takes place, and interfaces MEI between IFPdiagnoser 60 on the one side and MEP and MEC on the other side, and between MEC and MEP. The interfaces included in FIG. 5 will now be described more closely.

The interface IFPcontrolI contains the methods openIFP(ruID), that starts the IFP, closeIFP(ruID), that terminates the IFP, and a method verifyIFP( ), that verifies the IFP by initiating a doDiagnose sequence, possible return values being verifyOK, verifyNotOK, verifyRejected.

The interface IFPtoIFP provides methods for handling Fault Localization, Fault Coordination and Fault Recovery between the IFPs and is of the type Client/Server method/method interface.

The interface thus consists of methods for fault localization and fault coordination, and methods for fault recovery. The methods for fault localization and coordination are localizeIFP(IFPid), coordinateIFP(faultID), notFaultyIFP(reqIFPid, sending IFPid).

The methods for fault recovery are clearFaultIFP(faultID).

The Client IFP sends the method call Localize to the Server IFP, that has the relation connectedByInfluence to the client IFP. The Server IFP that receives the method call is engaged in the 'Localize' activity. This IFP will send acknowledge of this 'Localize' to the Client IFP when the localize loop in a branch located upstream has been terminated. If no IFP indicating a fault has been found, notFaultyIFP is sent to the Client IFP, otherwise the method call Coordinate is sent.

An exchange of method calls may be started by the Server IFP by it sending the method call Coordinate. This method call informs that an IFP which has indicated a fault, has been found and should be coordinated with other affected IFPs. This coordination is made possible by means of the IFPid parameter in the method call that identifies the IFP which has indicated a fault.

Fault recovery is based upon exchange of the method call clearFault. The exchange of method calls can be started by the Server IFP by it sending the call clearFault when this IFP is in full operation after having been affected by a fault (automatic recovery).

The interface has no states but only preconditions P. An incoming method call will result in an outgoing method call in accordance with certain preconditions P:

P1: The Server IFP has received a method call notFaulty-IFP from all its upstream neighbour IFPs.

P2: The Server IFP has received a method call noError-Detected after a request doIFPdiagnose.

P3: The Server IFP has received a 'Coordinate' method call from one of its upstream neighbour IFPs.

P4: The Server IFP has received a method call errorDetected from the IFP diagnoser.

P5: The Server IFP has received a method call noError-Detected which is not received as acknowledgement by doIFPdiagnose, but states that a faulty state has stopped to exist.

FIG. 25 shows a table over transitions at the IFPtoIFP interface in which the above preconditions are contained.

The interface DII between IFPpropHandler and IFPdiagnoser has as purpose to indicate methods for starting and ending requests regarding diagnosis to IFPdiagnoser. This is a method/method interface of the type Client/Server and consists of methods for activating and deactivating the diagnosis operation and request upon request for a diagnosis cycle.

The methods for requesting a diagnosis operation are located in IFPdiagnoser and are:

startIFPdiagnose(IFPid,diagnoseType)

The method startIFPdiagnose requests IFPdiagnoser to start diagnosis of supervised hardware and software. 'diagnoseType' can be either 'lookingForError' or 'lookingForRecovery'.

stopIFPdiagnose(IFPid)

The method stopIFPdiagnose instructs IFPdiagnoser to stop its diagnosing activity.

doIFPdiagnose(IFPid)

The method doIFPdiagnose instructs IFPdiagnoser to perform a diagnosis. IFPdiagnoser will always respond, also if no fault has been found.

In the above mentioned method call, 'IFPid' is the identity of the IFPpropagationHandler sending the call.

The methods for responding to diagnosis operations are located in IFPpropHandler, and are as follows errorDetected The method errorDetected informs IFPpropHandler that a fault has been found.

NoErrorDetected

Informs IFPpropHandler that no fault has been found.

Furthermore the following other methods are located in IFPpropHandler

DiagnoserOK

Informs IFPpropHandler that the link to the local processor is in operation.

DiagnoserNotOK

Informs IFPpropHandler that the link to the local processor is out of operation.

As regards dynamic behaviour the following applies:

The method call interface for requesting performance of diagnosis is based upon the method call interchange startIFPdiagnose(IFPid,diagnoseType), stopIFPdiagnose (IFPid), doIFPdiagnose(IFPid). In the method call startIFPdiagnose(IFPid,diagnoseType), the parameter diagnoseType indicates whether the Server should search for faults or for fault recovery. If the Server has received a startIFPdiagnose it will respond by errorDetected if a fault appears. If the method call startIFPdiagnose indicates searching for recovery, the diagnosing unit will respond with noErrorDetected when the fault has been recovered.

The method call stopIFPdiagnose does not receive any response from the Server.

The method call doIFPdiagnose instructs the Server to perform a diagnosis test cycle, wherein the answer from the Server is errorDetected or noErrorDetected.

The Server can use the method call diagnoserNotOK e.g. for informing the Client that the link to the local processor is out of operation. When the link is in operation again the Server sends diagnoserOK.

In FIG. 26 all possible state transitions for the DII interface are shown, the precondition being that a fault condition has been detected. These state transitions also appear from the state graph in FIG. 6 and the appurtenant description below.

The interface MEI between IFPdiagnoser and MEP and between IFPdiagnoser and MEC/MEP provides methods for obtaining measurement samples from MEP or MEC objects. These samples may be used for operation handling or fault handling.

The interface consists of methods for extracting measurement samples for performing diagnosing. The following methods are used by the Client:

startMeasurement(receiverID,measurementSpecification, IDofCallingObject), stopMeasurement(IDofCallingObject).

The method startMeasurement in the Server is used for providing a number of reports for an object requesting this, each report containing a list of samples. The method startMeasurement is used by different objects (IFPs) for extracting samples regarding the entity being measured. When the Server receives the method call startMeasurement it starts collecting samples from the supervised object. These samples are thereupon sent to the Server with the method call retrievedSamples.

More than one request may be processed in parallel.

The following diameters are used by the method startMeasurement:

MEPid: The identity of the MEP. This identity must be unique.

measurementSpecification: This is information given for each type of MEP. It may e.g. be the question of event or time trigged MEPs.

IDofCallingObject: this parameter is the identity of the object starting a measurement.

The method stopMeasurement in the Serverobject will be used for stopping all measurements requested by an object to the Server. All active measurements for the calling object will immediately be stopped without any report. This method accepts the following parameters:

IDofCallingObject: see above

The following methods are used by the Server retrievedSamples(listOfSamples,IDofCallingObject)

DP_linkError( )

DP_linkErrorCeased( )

The method retrievedSamples is provided by the Client and is used for allowing return of the requested samples to the Client. This method accepts the following parameters:

listOfSamples: a linked list with the samples the Server was requested to send.

IDofCallingObject: see above

With the method calls DP_linkError and DP_linkErrorCeased the Server can inform the Client of the status of the local processor link.

When the method call DP_linkError is sent this implies that the MEI interface does no longer exist. When a method call DP_linkErrorCeased is sent this implies that the interface has been recreated.

In the table in FIG. 27 all possible state transitions for the MEI interface are indicated.

The interacting and state propagating part 62 of IFP can take a number of states, indicated at 70 in FIG. 5, which are determined by that occurring in the chains of IFP described more closely below. The states in question, as well as the transitions between these, will now be described more closely with reference also to the state graph shown in FIG. 6, and continued reference to FIG. 5 and the description of its interfaces. In FIG. 6 the following acronyms are used:

| | |
|---|---|
| ed | errorDetected |
| ned | noErrorDetected |
| loc | localizeIFP |
| notf | notFaultyIFP |
| coord | coordinateIFP |
| clrf | clearFault |

Figure 6:
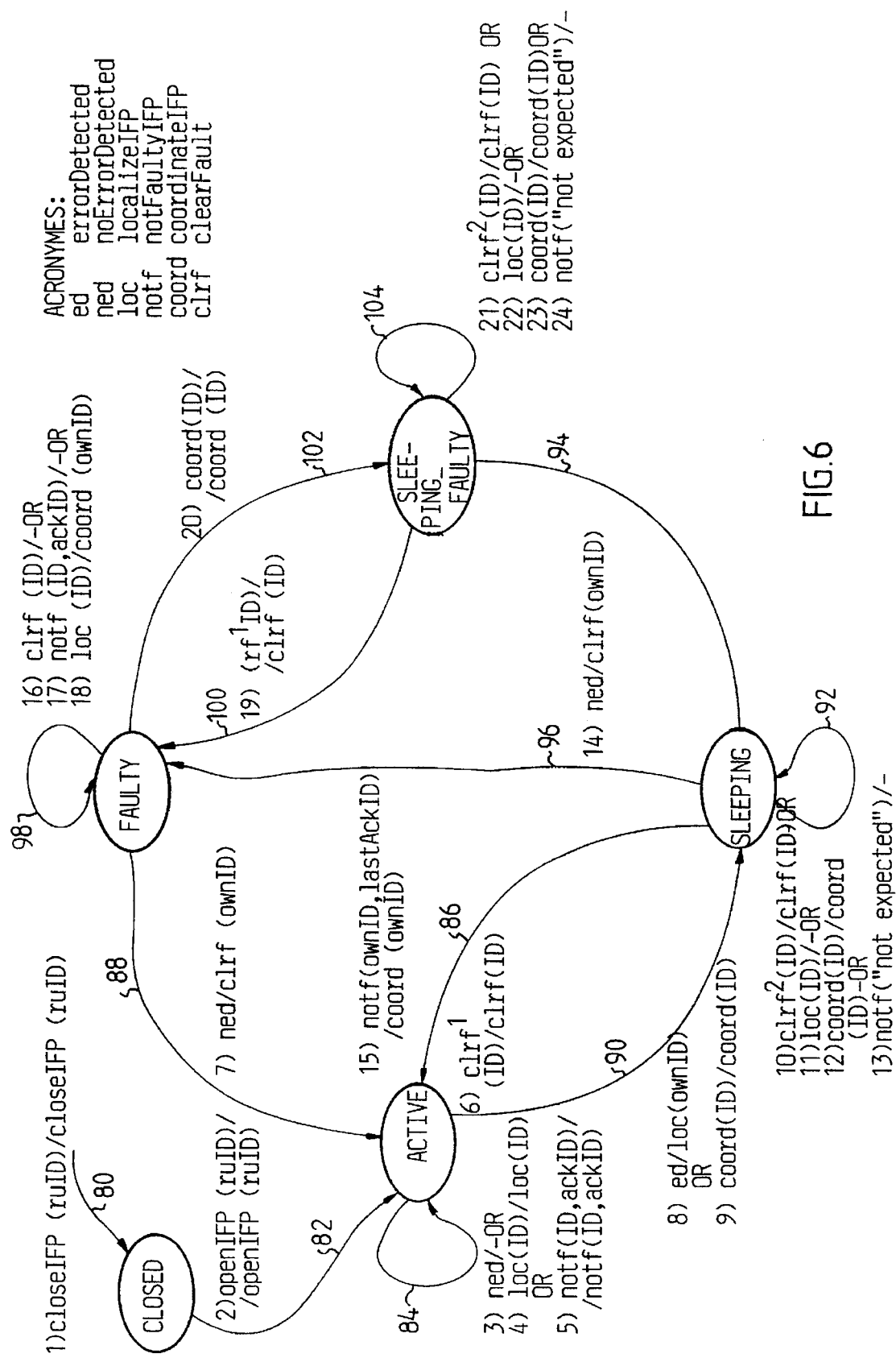
FIG. 6 shows a state graph illustrating different possible states and state transmissions of the object according to FIG. 5, FIG. 7 indicates the meaning of certain graphical symbols in influence graphs shown in the following Figures.

With reference to the graph in FIG. 6 said states are CLOSED, ACTIVE, SLEEPING, FAULTY and SLEEPING/FAULTY. Between these states transitions illustrated by arrows appear. The method calls leading to the different transitions, described more closely below, are indicated by use of the acronyms in question as input signal to own IFP/output signal to the next IFP In CLOSED or "transparent" state, IFP is transparent in the chains of IFPs. The transparent state is provoked either by the above mentioned method call closeIFP, or by a faulty state in the observation mechanism, such as e.g. due to interruption in the link between the processors 2 and 4 in FIG. 1, which would result in a transparent state of the IFP 62.1.

The transparent state implies that method calls localizeIFP, according to arrow 72, and coordinateIFP, notFaultyIFP and ClearFaultIFP, according to arrow 74, are only passed further to the next IFP in the chain. The diagnosing part 60 is also taken out of operation. The meaning of these method calls will appear more closely further on. The CLOSED state is the original state entered into by IFP before start of the system, and when a repair activity has been started. The state CLOSED also stores a list of identities of replaceable units, as the state of operation of an IFP may depend upon more replaceable units.

Transition 1, arrow 80:
closeIFP(ruID)/closeIFP(ruID)
Old state: CLOSED, ACTIVE, SLEEPING, FAULTY and SLEEPING/FAULTY.
New state: CLOSED
A repair activity has started and the IFP is set to the transparent state. The downstream IFP is informed by the output signal closeIFP(ruID), where ruID stands for the identity of the replaceable unit and is used for making possible management of replacement of more replaceable units simultaneously.

In the ACTIVE state which is the "normal" state for an IFP, the diagnosing part 60 operates and searches faults. The diagnosing part is started by the above mentioned instruction or method startDiagnose.

Transition 2, arrow 82:
openIFP(ruID)/openIFP(ruID)
Old state: CLOSED
New state: ACTIVE
The IFP is activated, e.g. after a repair or at system start. A downstream IFP is informed by the output signal openIFP (ruID). Observe that the state transition requires that all replaceable units, of which the IFP is dependent, have been taken out of operation, i.e. openIFP has been received from all replaceable units in the list.

Transition 3, arrow 84:
noErrorDetected/-
Old state: ACTIVE
New state: ACTIVE
The diagnosing part 60 of the IFP has reported that no error has been detected.

Transition 4, arrow 84:
localizeIFP(reqId)/localizeIFP(reqId)
Old state: ACTIVE
New state: ACTIVE
The input signal localizeIFP has been received from a downstream IFP, the method call is passed on to the upstream IFP. The identity of the calling IFP is saved, by reqId, together with the identity of the upstream branch where the method call localize was passed on.

Transition 5, arrow 84:
notFaultyIFP(reqId,sendingId)/notFaultyIFP(reqId, sendingId)
Old state: ACTIVE
New state: ACTIVE
No fault detecting IFPs were found in the upstream branch. The input signal notFaulty was passed on to the downstream IFP.

It should be noted that before the method call notFaultyIFP can be passed on, diagnosis has to be instructed, i.e. doDiagnose. To be able to handle this, a substate has to be introduced. In the simplified presentation shown in the state graph it is assumed, however, that the IFP already knows the result of such a diagnosing operation, i.e. no fault has been detected.

Transition 6, arrow 86:
clearFaultIFP(recoveredId)/clearFaultIFP (recoveredId)
Old state: SLEEPING
New state: ACTIVE
An earlier fault detecting IFP, i.e. not this IFP, has detected that the fault has disappeared for some reason, and indicates this in the input signal. In this case it may be assumed that the recovered fault was the only one detected in the upstream part of the influence chain, i.e. this was the last IfpId in the list of sleep requesting IFPs. The list of sleep requesting IFPs is declared more closely in the description of the state SLEEPING below.

The method call is passed on by the output signal to the next downstream IFP.

Transition 7, arrow 88:
noErrorDetected/clearFaultIFP(recoveredId=thisId)
Old state: FAULTY
New state: ACTIVE
This IFP has detected that the fault earlier detected by this IFP has disappeared. The method call clearFaultIFP is passed on downstream to the next IFP.

In the state SLEEPING the diagnosing part 60 of the IFP is deactivated. This state can be taken in two ways:
the diagnosing part has detected a fault, a localizing mechanism has started, that causes that the method call localizeIFP is sent upstream in the chain of IFPs, the method call coordinateIFP has been received, which implies that there is a fault upstream in the chain of IFPs, and results in the IFP in question passing over to the SLEEPING state.

In the SLEEPING state there is stored a list of identities of the upstream IFPs which have passed into the state FAULTY. All IFPs introduced into the list have instructed this IFP to pass over to the state SLEEPING.

Transition 8, arrow 90:
 errorDetected/localizeIFP(reqId=thisId)

Old state: ACTIVE

New state: SLEEPING

The diagnosing part has detected a fault, the localizing mechanism is started, a method call localizeIFP is sent upstream.

Transition 9, arrow 90:
 coordinateIFP(faultyId)/coordinateIFP(faultyId)

Old state: ACTIVE

New state: SLEEPING

The input signal coordinateIFP has been received, i.e. there is an upstream IFP that has detected a fault.

Transition 10, arrow 92:
 clearFaultIFP(recoveredId)/clearFaultIFP(recoveredId)

Old state: SLEEPING

New state: SLEEPING

An earlier fault detecting IFP has detected that a fault has recovered and informs of this by the method call clearFault, which is passed further downstream. In this case it is assumed that this recovered fault was not the only one detected in the upstream part of the influence chain, i.e. this was not the last IfpId in the list of sleep requesting IFPs.

The method call is passed on by means of the output signal to the next downstream IFP.

Transition 11, arrow 92:
 localizeIFP(reqId)/-

Old state: SLEEPING

New state: SLEEPING

This IFP has already been coordinated and therefore this localize call can be neglected.

Transition 12, arrow 92:
 coordinateIFP(faultyId)/coordinateIFP(faultyId)

Old state: SLEEPING

New state: SLEEPING

An input signal coordinateIFP has been received, i.e. there is an upstream IFP that has detected a fault. If this fault detecting IFP has already been coordinated, the coordination may be neglected, otherwise the identity is saved in the list of sleep requesting IFPs.

Transition 13, arrow 92:
 notFaultyIFP("not expected")/-

Old state: SLEEPING

New state: SLEEPING

Disregard this input signal.

Transition 14, arrow 94:
 noErrorDetected/clearFaultIFP(faultyId=thisId)

Old state: SLEEPING/FAULTY

New state: SLEEPING

The diagnosing part of the IFP has reported that the fault has been recovered. There is however at least one detected and uncleared fault in the upstream branch. The output signal ClearFaultIFP is sent downstream.

The state FAULTY implies that the diagnosing part 60 of the IFP has observed that the entity supervised by it is fault causing. The diagnosing part is taken into operation but does now look for "noError", implying that fault recovery is proceeding. The state in question is taken when IFP has received the message notFaultyIFP from all upstream links in the chain, which are in a "isConnectedbyInfluence" relation to the IFP in question, which will likewise be described more closely below.

Transition 15, arrow 96:
 notFaultyIFP(reqId,expAckId)/coordinateIFP(faultyId=thisId)

Old state: SLEEPING

New state: FAULTY

The input signal indicates that no arrow has been detected in the upstream branch. This must be the "fault causing" IFP, i.e. the most upstream IFP has detected the fault.

The downstream IFPs are coordinated via the output signal coordinateIFP.

Transition 16, arrow 98:
 clearFaultIFP/-

Old state: FAULTY

New state: FAULTY

This shall never occur. Neglect the input signal.

Transition 17, arrow 98:
 notFaultyIFP(reqId,expAckId)/-

Old state: FAULTY

New state: FAULTY

Disregard the input signal.

Transition 18, arrow 98:
 localizeIFP(reqId)/coordinateIFP(faultyId=thisId)

Old state: FAULTY

New state: FAULTY

This IFP has already taken the responsability to be fault causing. The output signal coordinateIFP shall be sent downstream.

Transition 19, arrow 100:
 clearFaultIFP(recoveredId)/clearFaultIFP(recoveredId)

Old state: SLEEPING/FAULTY

New state: FAULTY

An earlier fault detecting IFP, i.e. not this one, has detected that the fault has recovered for some reason, and indicates this by the input signal. In this case it is assumed that the recovered fault was the only one detected in the upstream branch of the influence chain, i.e. it was the last IfpId in the list of sleep requesting IFPs.

The method call is passed on by the output signal to the next downstream IFP.

The state SLEEPING/FAULTY implies that the diagnosing part 60 of the IFP has found that an entity supervised thereby is fault causing but the diagnosing part has been taken out of operation due to another fault. This situation may appear in a double fault situation. After the IFP has observed that its supervised entity is fault causing—the first fault—the method call coordinateIFP is received that indicates that a new fault—the second fault—has appeared earlier in the influence chain. Depending upon the fault that disappears first, the IFP once again enters the state FAULTY when the other fault has disappeared, or the state SLEEPING when the first fault has disappeared.

Transition 20, arrow 102:
 coordinateIFP(faultyId)/coordinateIFP(faultyId)

Old state: FAULTY

New state: SLEEPING/FAULTY

By the input signal the method call coordinateIFP is received, i.e. there is an upstream IFP that has detected a fault.

Transition 21, arrow 104:
   clearFaultIFP(recoveredId)/clearFaultIFP
   (recoveredId)
   Old State: SLEEPING/FAULTY
   New state: SLEEPING/FAULTY An earlier fault detecting IFP, i.e. not this one, has detected that a fault has recovered for some reason, and indicates this in the input signal. In this case it is assumed that the recovered fault was not the only one detected in the upstream branch of the influence chain, i.e. this was not the last IfpId in the list of sleep requesting IFPs.

The method call is passed on by the output signal to the next downstream IFP.

Transition 22, arrow 104:
   localizeIFP(reqId)/-
   Old state: SLEEPING/FAULTY
   New state: SLEEPING/FAULTY This IFP has already been coordinated and therefore this localize request may be neglected.

Transition 23, arrow 104:
   coordinateIFP(faltyId)/coordinateIFP(faultyId)
   Old state: SLEEPING/FAULTY
   New state: SLEEPING/FAULTY A method call coordinateIFP is received, i.e. there is an upstream IFP that has detected a fault. If this fault detecting IFP has already been coordinated, the coordination may be disregarded, otherwise the identity is stored in the list of sleep requesting IFPs.

Transition 24, arrow 104:
   notFaultyIFP("not expected")/-
   Old state: SLEEPING/FAULTY
   New state: SLEEPING/FAULTY Neglect the input signal.

With reference to FIG. 1 and that described above with reference to FIGS. 5 and 6 a simple practical embodiment of fault supervision will now be described, e.g. for pointing to a faulty replaceable unit.

An ATM link 106 is supervised with respect to faults in the cell head of cells transferred on the link. Such faults may be caused by bad transmission quality, sender fault, receiver fault or link fault. The replaceable unit can thus, but need not, form part of the link. More particularly, it is here assumed that so called Header Error Check, HEC, is used. This type of error check is described in CCITT Draft Recommendation I.432, "B-ISDN User Network Interface—Physical Layer Specification". More particularly HEC is a type of CRC (Cyclic Redundancy Check), which is described in "Data Communications, Computer Networks and OSI" by Fred Halsall, Addison-Wesly, p. 98. In FIG. 1 a block 108 represents the HEC check.

The "Header" checksum of the ATM cells is calculated and the result is compared to a field of check sums, a so called HEC field, included likewise in the cell head. In case of dissimilarity, i.e. in case of error, a counter for the number of faulty cells is stepped. In the present example this counter is mep 54.1.

The Mep 52.1 in the local processor 4 records the count value of the counter 54.1, this value being represented in both 52.1 and 54.1 by a counter value window 110. The IFP diagnoser 60.1 in the local processor 4 analyses the counter values in accordance with a so called "leaky bucket" algorithm, which is a tool well known to the man of the art in similar cases, and that has the purpose of detecting whether too many cells have been lost per time unit. The result obtained is the diagnosis, i.e. errorDetected/noErrorDetected, cf. FIG. 5.

When a fault occurs IFPpropHandler 62.1 in the central processor 2 (cf. also FIG. 5) is informed of this, provided that IFPpropHandler is in the state ACTIVE. If the IFPpropHandler is in the state FAULTY noErrorDetected messages are only passed on. The above results in a minimum of signalling between CP 2 and DP 4, i.e. only signals with state changes.

In FIG. 7*a–d* there are shown graphical symbols used in the following FIGS. 8–12, 15, 16 and 23, 24 for describing chains of inference points. More pariculaxly there is shown in FIG. 7, at a) the symbol for an inference point IFP, at b) the symbol for a fault terminating inference point, at c) the symbol for an influence link, and at d) the symbol for the beginning of an influence chain. In the very schematic example in FIG. 1 the IFPs 60.1/62.1 are assumed to be located at the beginning of an influence chain, in which IFPs 60.2/62.2 are fault terminating IFPs.

In FIGS. 9–12, 15, 16 and 23, 24 there is also indicated, under the respective chains, direction and name of below discussed signals and acknowledgements by arrows with appurtenant message text.

Figures 7, 8:
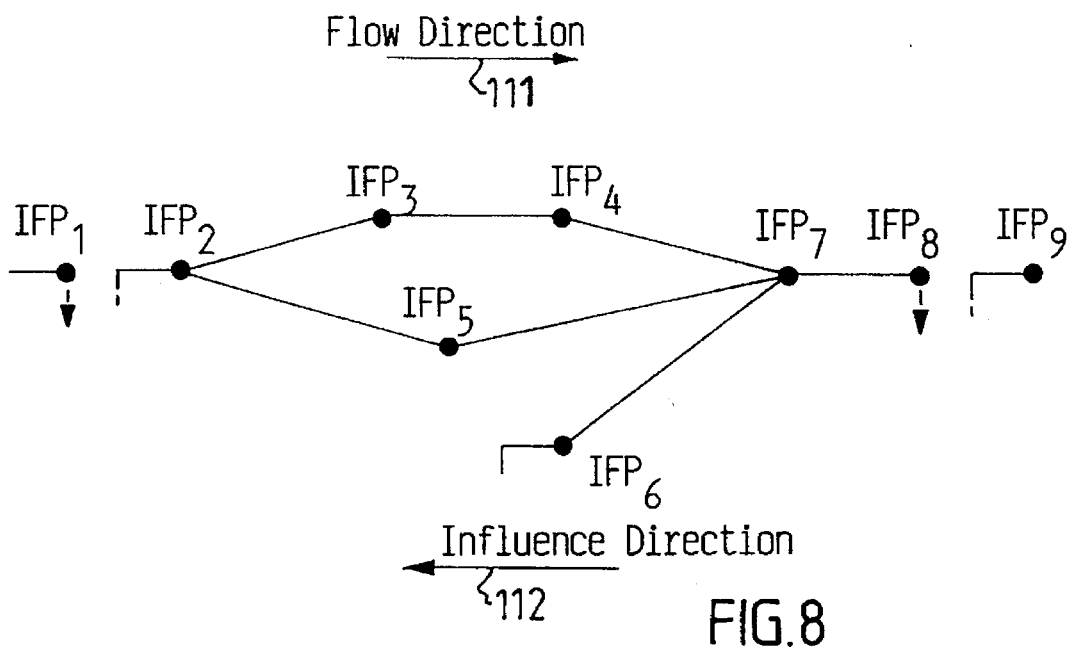
FIG. 8 is an example of such an influence graph.

In FIG. 8 there is shown an example of an influence graph including a number of interconnected inference points $IFP_1$–$IFP_9$. With reference to FIG. 7 it may be noted that $IFP_1$ and $IFP_8$ are fault terminating inference points, and that $IFP_2$, $IFP_6$ and $IFP_9$ are located at the beginning of an influence chain. From the example it also appears that an inference point may be connected to several inference points, both downstream and upstream. By downstream is here meant the direction of the fault propagating flow according to arrow 111. It also appears that the direction of the fault propagating flow is opposite to the direction of the influence relations according to arrow 112.

The fault localization is based upon the assumption that a fault has been caused in the domain supervised by the most upstream inference point that detected the fault. The following strategy is used for localizing this first upstream inference point.

Assume that a fault has been detected by an inference point. Before the inference point can decide whether the fault is really located at the inference point in question or not, it must go out to ask its neighbours, opposite to the flow direction, from where the fault may have been propagated. The search for the origin of the fault continues until an inference point has been reached, in which one of the following conditions has been fulfilled:

The reached inference point is not influenced by any other influence point, i.e. a fault may not have been propagated to this inference point. This is true for the inference points $IFP_2$, $IFP_6$ and $IFP_9$, which are not connected upstream to any other inference point.

The reached inference point has likewise detected a fault.

It should furthermore, in this connection, be emphasized that a flow can degenerate into one single point, i.e. start and terminating point is the same. The supervision is performed only for one type of phenomenon or fault.

Figure 9:
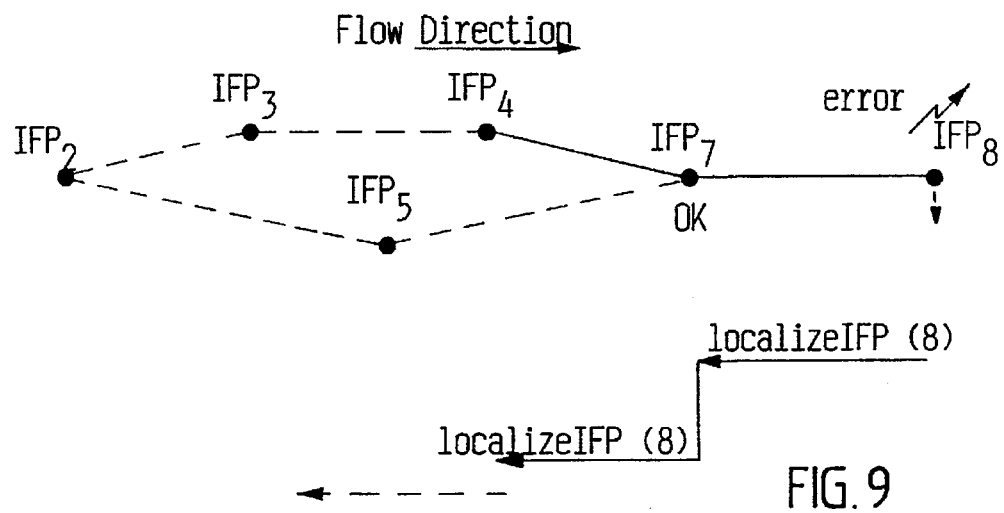
FIG. 9 shows an example of an influence graph in connection with fault localization.

With reference to FIG. 9, and that described above with reference to FIG. 4, the inference point $IFP_8$ has detected a fault. As soon as this has occurred it sends a localize request to an upstream inference point $IFP_7$. This request has the form of the method call localizeIFP. This method call has an identity parameter identifying the origin of the localize request. In the case in question the request takes the form of localizeIFP (8), cf. the arrow identified in the same way in the Figure, where (8) identifies $IFP_8$ as origin of the request. The requesting inference point $IFP_8$ takes the sleep state, i.e. its analysing and diagnosing part is taken out of operation.

An inference point can only have one outstanding localize request with the same identity, i.e. $IFP_7$ must wait for acknowledgement from $IFP_4$ before it continues the investigation of the next branch, i.e. $IFP_5$. The sending inference point IFP must trace the outstanding method call localizeIFP. This is performed by saving the identity of the localize request and the identity of an upstream inference point, from which an acknowledgement may be expected.

Figure 10:
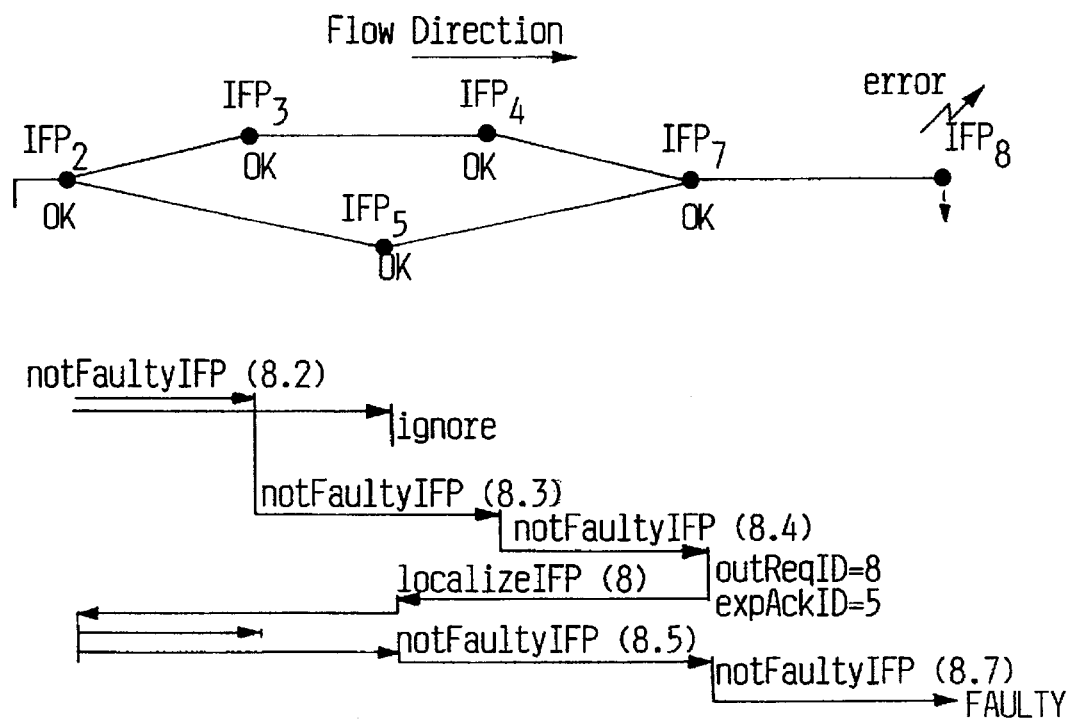
FIG. 10 shows a graph illustrating acknowledging measures in the example according to FIG. 9.

When the localize request has reached an inference point IFP connected to a starting point of the influence chain and this inference point has not detected any fault, there is sent an acknowledgement of the request downstream to all branches, which is illustrated in FIG. 10 in which the current inference point is $IFP_2$. The acknowledgement of a localize request has the form of a method call notFaultyIFP.

This method call has two parameters, one identifying the origin of the localize request and one identifying the sending inference point. The acknowledgement from $IFP_2$ takes the form of notFaultyIFP (8,2) as appears from the diagram of FIG. 10, identifying the inference point $IFP_8$ and the inference point $IFP_2$, respectively. The appearance of other acknowledgements, as well as the localize request likewise appears from the diagram in FIG. 10. An inference point accepts a method call notFaultyIFP only if it is an acknowledgement of an outstanding request, i.e. the identity of the sending inference point is equal to the expected acknowledgement.

Before an inference point, such as $IFP_7$ in FIG. 10, is allowed to pass on a method call notFaultyIFP along the influence graph, it must have fulfilled the localize request of all upstream branches, which in FIG. 10 are two. An inference point IFP is furthermore not allowed to send any method call notFaultyIFP until it has observed whether the supervised mechanism has been found faulty or not. With this limitation there is no need of time correlation between the inference points in an influence graph, i.e. it does not matter if a fault downstream is discovered before the cause of the fault upstream is detected.

When the inference point $IFP_8$ responsive for the outstanding localize request has been reached, the passing on of the acknowledgement is stopped.

If the inference point IFP that received a method call localizeIFP also has detected a fault nothing happens other than that the identity of the requesting inference point IFP is stored, i.e. the method call localizeIFP is not passed on upstream. This case will be handled by the fault coordinating mechanism described more closely later on.

When a fault detecting inference point has received a method call notFaultyIFP on each outstanding method call localizeIFP the fault may be regarded as being located in the observed entity analysed by the inference point. Such an inference point now changes mode of the fault detecting mechanism and, more particularly, now detects the disappearance of the fault, as has been described above with reference to FIGS. 5 and 6. There must be present hysteresis between the detection of the two levels of a fault and the detection of the disappearance of the same fault.

At use of the above described fault localize strategy the number of searches may increase very fast with the number of branches in the influence graph. This may present a problem if such great influence graphs will be usual.

Figure 11:
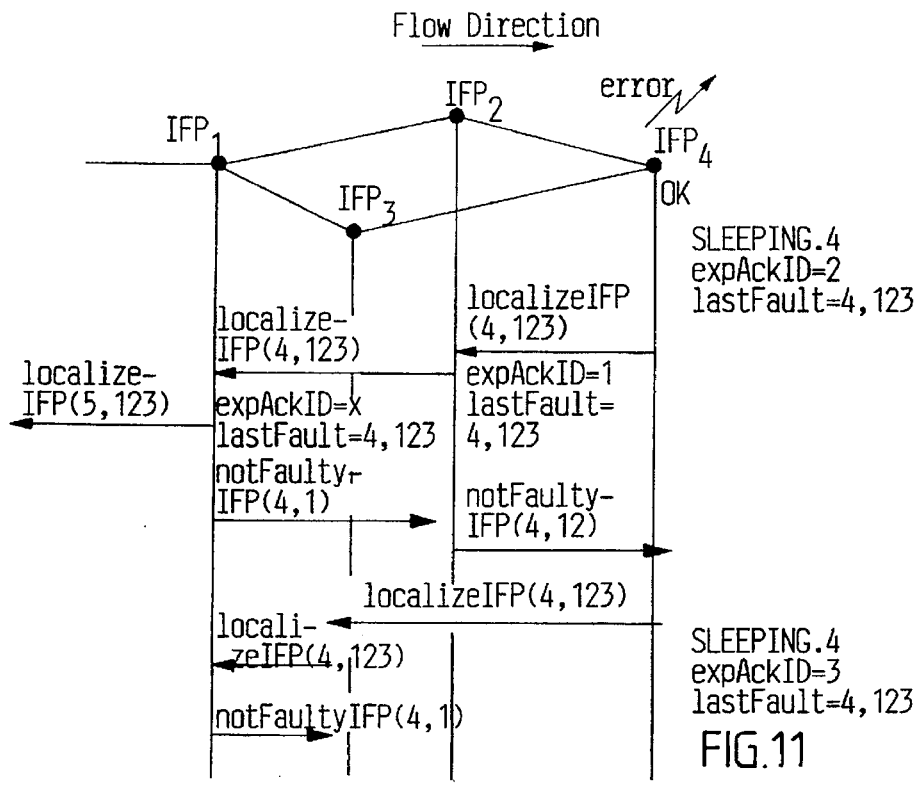
FIG. 11 is a graph illustrating a first improvement of the search algorithm in connection with fault localization.

For improving the search algorithm in order to find the most upstream fault detecting IFP without having to search so much, there may be introduced according to a first modification and with reference to FIG. 11, a fault sequency number local to each inference point. When a fault is detected by the inference point $IFP_4$ this inference point steps forward by a fault sequency number 123, which is passed on as a parameter in the method call localizeIFP (4, 123), which is sent by the inference point $IFP_4$. The sequence number 123 together with the identity 4 of the requesting inference point are stored by the IFPs along the localized branch of the graph. The stored information indicates that upstream branches are already investigated and that acknowledgement can be sent downstream immediately. When thus the second localizeIFP request is received by $IFP_1$ via $IFP_2$, $IFP_1$ understands that this fault has already been localized in the upstream branches, since the identity of the localizeIFP request is equal to the value of the variable lastFault. Thereby notFaultyIFP may be sent downstream immediately.

Figure 12:
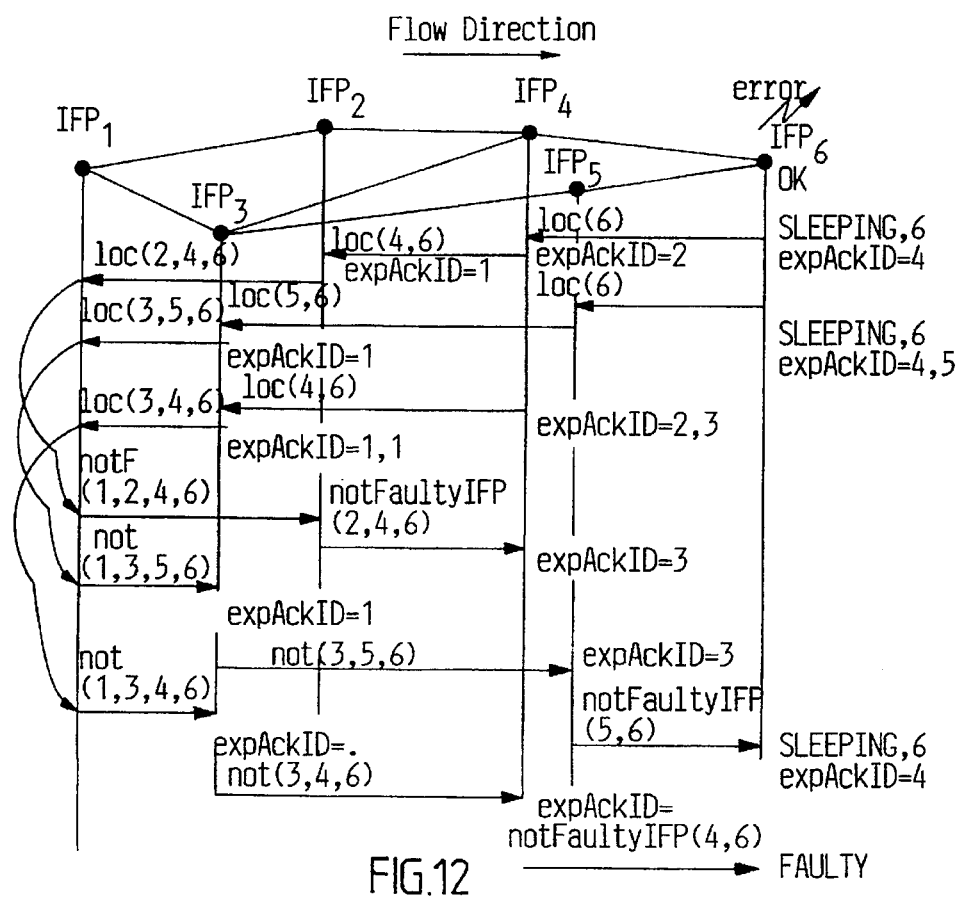
FIG. 12 is a graph illustrating a second improvement of the search algorithm in connection with fault localization, FIGS. 13 and 14 schematically illustrate the influence of modelling with two different types of relations on the appearance of the influence graphs.

In another modification for improvement of the search algorithm and with reference to FIG. 12, the investigation of the upstream branches may be performed in parallel instead of investigating one at a time. For this purpose the information of the branch that has been passed by the request, must be added to the parameter list of the method call localizeIFP. These parameters may be implemented as a "stack", to which each inference point sending a method call localizeIFP, adds the own identity. After $IFP_6$ in FIG. 12 has observed emergence of a fault and sends the localize request upstream, the identities of the respective IFPs in the three branches $IFP_6$-$IFP_4$-$IFP_2$, $IFP_6$-$IFP_5$-$IFP_3$ and $IFP_6$-$IFP_4$-$IFP_3$, are successively added so that $IFP_1$ at last receives the method calls localizeIFP(2,4,6), localizeIFP(3,5,6) and localizeIFP (3,4,6), respectively. For the sake of clearness these method calls have been shortened to "loc" in FIG. 12. The sending inference point $IFP_6$ must keep track of these outstanding method calls. This is performed by means of a counter and by storing the identity of the method call. Before a method call notFaultyIFP is returned, shortened to "notF" in FIG. 12, acknowledgements "expAckID" must have been received on each upstream branch. The identity parameter, i.e. the stack, is returned by the method call notFaultyIFP. Each time a method call notFaultyIFP is sent, an updating operation of the stack is performed. This is shown in FIG. 12 as having been performed by the first identity in each successively updated stack being the identity of the returning IFP, which has been attained by removing the identity of the most recent preceding returning IFP. $IFP_6$ thus receives at last the messages notFaultyIFP(5,6) and notFaultyIFP(4, 6). The result is that $IFP_6$ is found to be the IFP which is responsive for the faulty domain.

In a third modification of the search algorithm the fault affecting relation between inference points can be modelled as a user/provider relation, also called 'isDependentUpon', instead of the relation 'isConnectedByInfluence'. This type of relation means that the state of operation of the user is completely dependent upon the state of operation of the provider. In the case of inference points related to each other according to this type of relation this implies that the fault state of an inference point is only dependent upon the fault state of the closest upstream inference points. At localization of the origin of the fault it is thus not necessary to continue further with localizeIFP after an inference point that regards itself as being free of faults. It can for certain be said that there are no fault detecting inference points upstream.

Modelling with the relation 'isDependentUpon' will give another appearance to the influence graphs. They often become less deep, at the cost of more branches.

Figure 13:
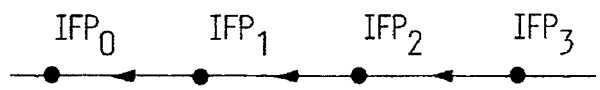
Figure 14:
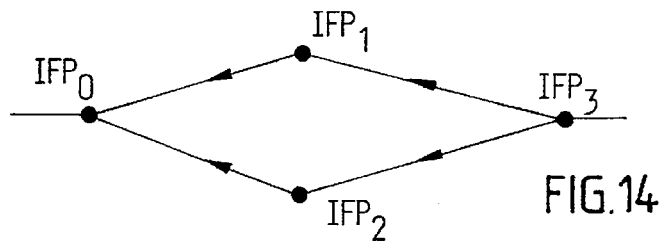
Figure 15:
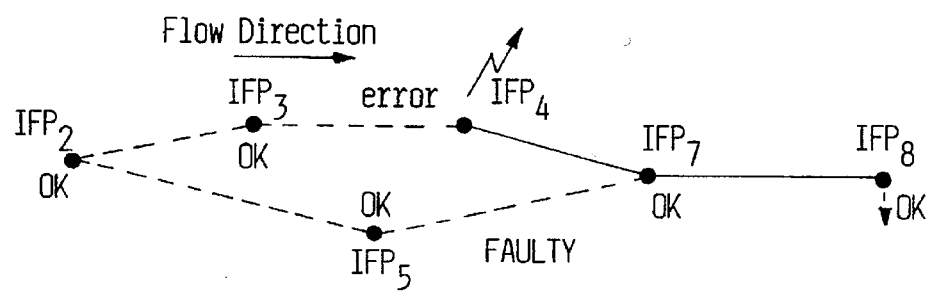
FIG. 15 shows an influence graph intended to describe fault coordination.

That said above is illustrated more closely in FIGS. 13 and 14.

Assume that there are four IFPs, viz. $IFP_0$, $IFP_1$, $IFP_2$ and $IFP_3$ having the following relations with respect to the fault detecting behaviour.

If $IPF_1$ detects a fault then also $IFP_0$ can detect a fault.
If $IFP_2$ detects a fault then also $IFP_0$ can detect a fault.
If $IFP_3$ detects a fault then also $IFP_1$ detects a fault.
If $IFP_3$ detects a fault then also $IFP_2$ detects a fault.

FIG. 13 shows in this case the resulting graph in case of modelling with the relation isConnectedByInfluence, whereas FIG. 14 shows the graph in case of modelling with the relation isDependentUpon.

Here the fault coordinating strategy will be described more closely.

The fault coordination is based upon the understanding that all inference points IFP located downstream of a fault responsible inference point lack interest, since no new faults can be detected and separated by these inference points. These inference points can take the SLEEPING state and set its fault detecting mechanism out of operation.

As soon as an inference point has observed that a detected fault is within its domain of response, it will send the coordinating method call coordinateIFP to all downstream inference points. This method call is passed on along the influence graph until a fault terminating inference point has been found. The identity of the measurement point having observed the fault follows a method call and is stored by the passed inference points.

That described above is illustrated in FIG. 15, where the inference point $IFP_4$ has observed that a detected fault is located within its domain of a response, and therefore sends a method call coordinateIFP (4) downstream to the inference points $IFP_7$ and $IFP_8$, which take the state SLEEPING and set their fault detecting mechanism out of operation.

Here now follows a description of the fault recovery strategy.

When a fault has been reset, automatically or by repair, the inference point IFP, the supervised entity of which has been found faulty, will detect that the fault has disappeared, since its diagnosing part was taken into operation again as soon as the fault was observed, having as a task to detect the disappearance of the fault, as has been described above with reference to FIGS. 5 and 6. All downstream inference points will be informed about the disappearance of the fault by the fault eliminating method call "clearFaultIFP". This method call is passed on along the influence graph until a fault terminating inference point IFP has been found. The identity of the recovered inference point IFP follows the method call.

When an inference point has received the method call clearFaultIFP, it will start supervising faults again. Of course all inference points having forced this inference point to the state SLEEPING, must have recovered first.

Figure 16:
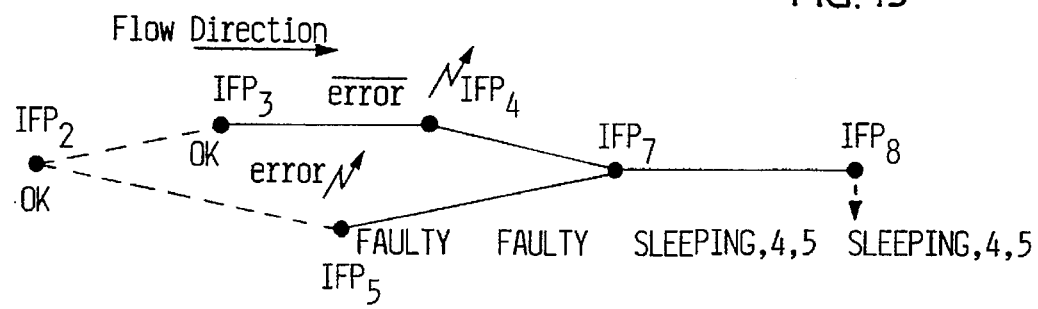
FIG. 16 shows an influence graph illustrating fault reset.

That described is illustrated in FIG. 16, where the inference point $IFP_4$ sends the method call clearFaultIFP (4) to $IFP_7$ and $IFP_8$, which start supervision again.

Figure 17:
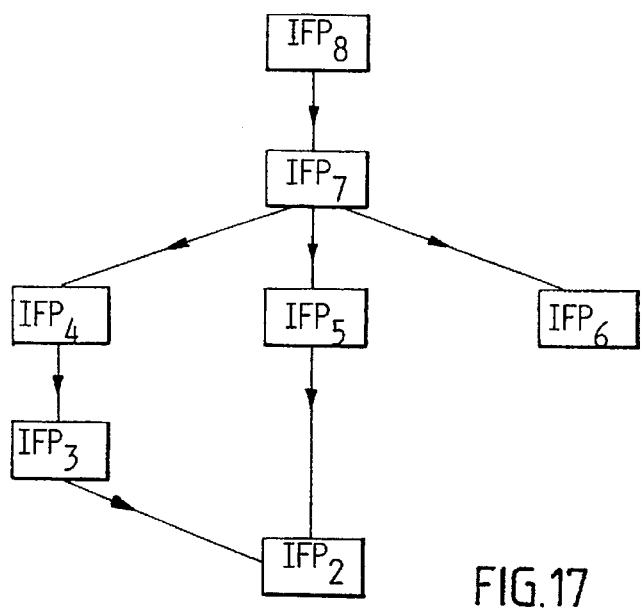
FIG. 17 shows an object relation model of the influence graph according to FIG. 8.

In FIG. 17 the influence graph according to FIG. 8 has been drawn in a conventional way as an instantiated object relation model. The direction for a relation between inference point objects shall be treated, by way of definition, as the opposite to the fault propagating direction. More particularly there is here the question of the relation connectedByInfluence.

With reference to FIG. 17 the relation connectedByInfluence states: due to the fact that $IFP_7$ is connected by influence to $IFP_4$, a fault detected by $IFP_7$ can also have been detected by $IFP_4$ and/or any other inference point which is connected by influence to $IFP_4$, i.e. $IFP_3$ in this case.

Here indication of faulty function objects FO shall now be described more closely below.

As earlier discussed a function object FO is a representation in software of a function which is implemented by one or more systems. The function objects can represent functions on all types of abstraction levels.

A function object can be indicated as faulty by the inference points IFP. In other words, it is the inference points which are responsive for the supervision of the functions.

As soon as an inference point has been localized as "faulty", the supervised functions are informed and are designated as faulty. In the example according to FIG. 15 $IFP_4$ has the responsibility of sending a fault indicating message to all function objects FO supervised by it.

The relation between the inference point IFP and the function object FO is a many-to-many-relation, i.e. a function can be supervised by many inference points and an inference point can supervise many functions. The function objects can however as well be implemented as inference points themselves. Only method calls such as coordinateIFP and clearFaultIFP are used between function objects (the fault has already been localized).

As soon as the origin of a fault has been localized, i.e. an inference point has been identified as responsive for the domain where the fault was first detected, the inference point IFP has the responsibility for indicating a replaceable unit RU as faulty.

The relation between the inference point IFP and the replaceable unit RU is a many-to-many-relation. The domain supervised by the inference point IFP can cover more than one replaceable unit RU. This is often the case when interfaces between replaceable units are concerned.

Before a replaceable unit RU is replaced the IFPs depending upon the replaceable unit have to be terminated (closeIFP) in order to prevent unnecessary alarms. After replacement the inference point is taken into operation again (openIFP).

Figure 18:
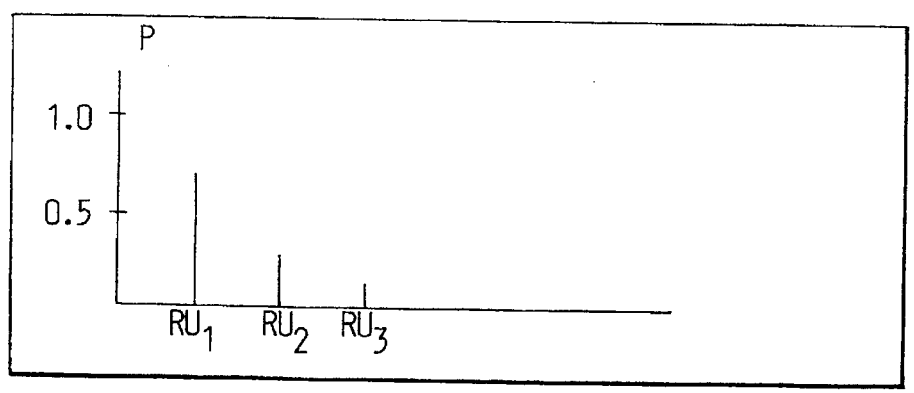
FIG. 18 shows an example of a probability function.

For enabling fault indication only of one replaceable unit RU at the same occasion, a probability function is introduced as an attribute in the inference points IFP. This probability function indicates the probability for the fault being located in a certain replaceable unit RU, cf. the bar diagram in FIG. 18, where the probability P for faults is indicated in a scale from 0 to 1 on the Y-axis. The probability for a fault in the three replaceable units RU1, RU2, RU3 is indicated in the form of bars.

Figure 19:
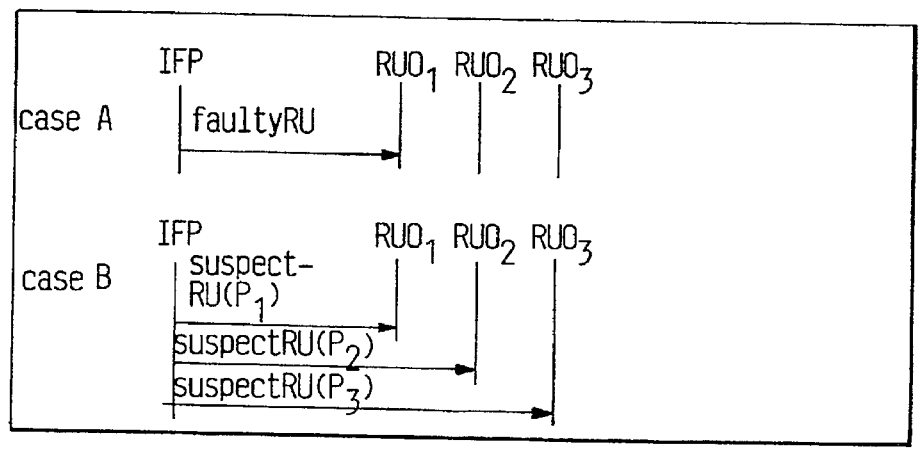
FIG. 19 illustrates two cases of fault handling of faulty replaceable units while using a probability function according to FIG. 18.

The inference point IFP can use the probability function as a basis for determining the unit that shall be replaced, or also the decision can be passed on to the objects RUO which represent replaceable units, bypassing on the probability value with the fault indication method call. These two cases are illustrated in FIG. 19 as cases A and B, respectively.

In the case A, IFP has decided that RU1 is faulty, as indicated by the arrow faultyRU to RUO1. In the case B the decision to the respective objects RUO is passed on as indicated by arrows suspectRU (P1, P2 and P3, respectively) to RUO1-3.

The part of the software model taking care of the fault behaviour analysis of functions is responsible for the coordination of the fault regarding function entities.

Figure 20:
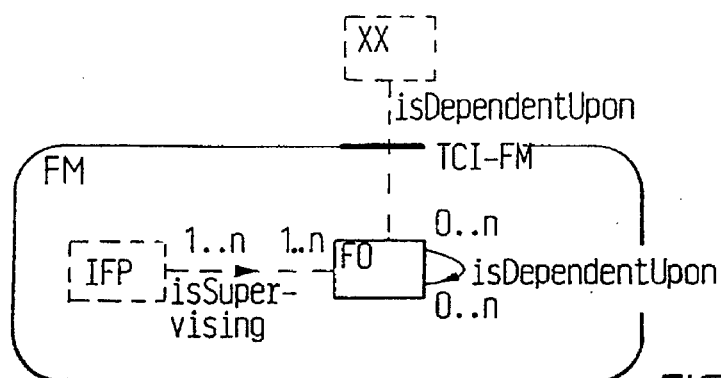
FIG. 20 shows a function analysing part of a model for fault handling analysis of functions.

This model is rather simple, since it consists only of one type of object, viz. the function object FO supervised by an IFP, cf. FIG. 20. The function object represents a function which is implemented by telecommuncation equipments and they represent functions on all abstraction levels.

The analysis of the influence of a fault on the supervised functions is rather simple. The fault is already detected, identified and localized. The analysis of the behaviour is performed during the modelling phase. In real time the task is limited to a pure state propagation between the function objects FO.

During the modelling phase the dependence between the functions must be carefully analysed. If the operational state of a function depends upon other functions, this must be reflected in the software model as a relation isDependentUpon between the function objects.

Figure 21:
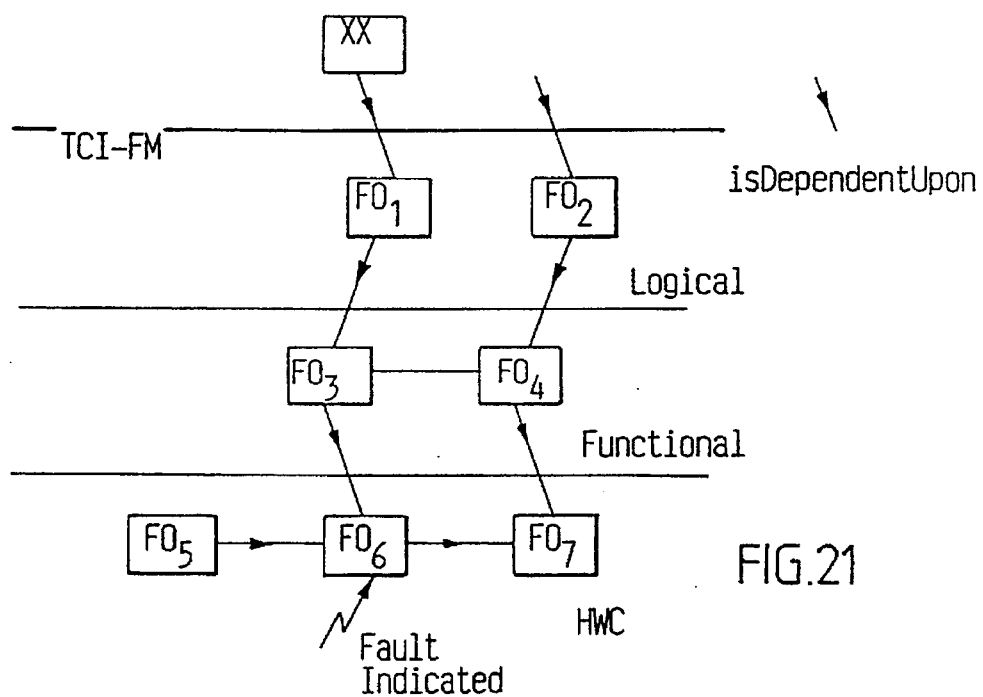
FIG. 21 illustrates state propagation between function objects.

With reference to FIG. 21, FO6 has been indicated as faulty by the hardware supervision model. The function objects FO5 and FO3 depend upon FO6. Thereby these two objects will likewise be regarded as faulty. The propagation of states will continue until no more dependencies are found.

Dependencies exist within and between functions on different abstraction levels. The state propagation is not limited to objects in one single telecommunication equipment. Functions in a telecommunication equipment can of course depend upon functions in another such equipment.

The interface between function objects FO is implemented in such a way that only method calls of the type coordinate and clearFault are used, since the fault has already been localized.

Figure 22:
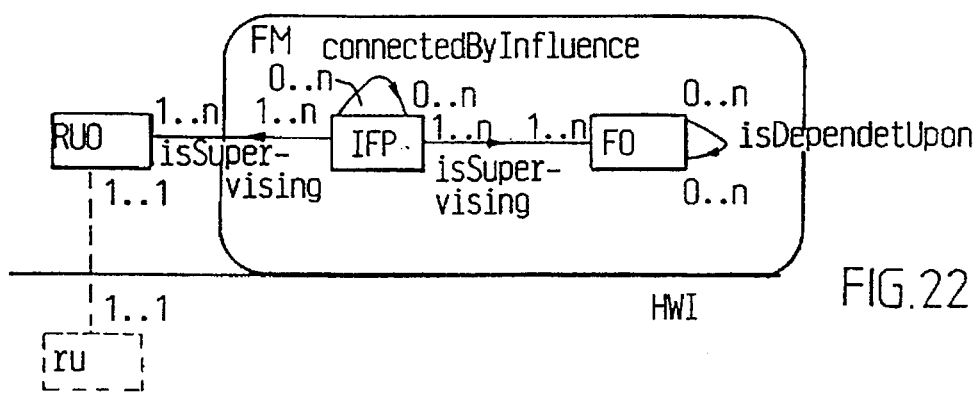
FIG. 22 illustrates the design of a repair handling model.

The part of the model relating to repair handling is used by a function for facilitating replacement of faulty hardware units. An object relation representation of the model is shown in FIG. 22.

When the operator has requested a repair measure this request is passed on to the object RUO that represents the replaceable unit. The request in question can be performed in either of two ways, viz. by the operation station of the operator and the interface to the controlled object representing the replaceable unit RU, or by pressing a button mounted on the replaceable unit.

The object RUO informs the involved inference points IFP which must stop detecting faults. Each inference point IFP which is affected by the repair activity asks the function objects FO to stop the current use of the supervised function that the function objects FO represent. Thereby the replaceable unit RU is terminated and may be removed.

When a new unit is installed there is performed a starting or acceptance test of the new unit before it is taken into service.

Assume that a replaceable unit RU must be replaced due to hardware fault. All inference points IFP supervising the replaceable unit RU are informed. All inference points IFP downstream in the involved influence graphs are likewise informed. This avoids unnecessary alarms at replacement of the hardware. The involved objects are informed by state propagation.

The state propagation is performed until an inference point IFP has been reached, for which either of the following possibilities has been fulfilled:

the inference point IFP is a fault terminating inference point, the inference point IFP has already been informed of the repair activity.

Figure 23:
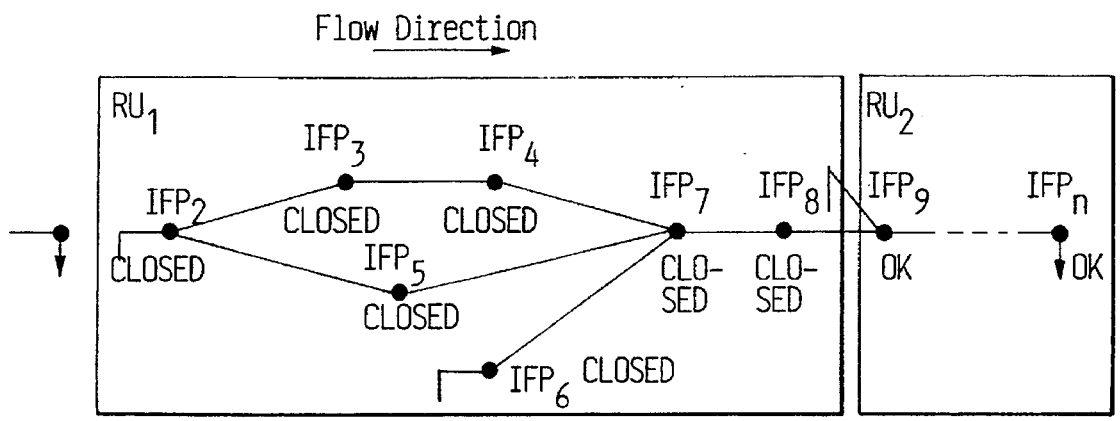
FIG. 23 shows an example of an influence graph which may appear in connection with repair handling.

FIG. 23 shows an example in which RU1 has been indicated as faulty due to a fault localized in the inference point $IFP_4$. When a repair measure is required, the inference points $IFP_2$ to $IFP_8$ responsible for supervision of the replaceable unit are informed immediately by the object representing RU1. These inference points will be completely taken out of operation, i.e. they close its fault detecting mechanism, and inform the functions the supervision of which they are responsible for, about the termination of the unit.

It should be noted that an inference point IFP can change its fault propagation behaviour at transition to the mode taken out of operation. This is the case for $IFP_8$ in the example according to FIG. 22, cf. FIG. 8. This implies that the influence graph may be somewhat modified when it is regarded from a repair handling point of view.

$IFP_9$ to $IFP_n$, which are responsive for the supervision of RU2, are informed of the termination of the unit by $IFP_8$. These IFPs will only close their fault detecting mechanism, the involved functions being not informed.

As has been mentioned earlier each IFP taken out of operation is responsible for informing the function objects about the termination of the unit. The function objects will terminate the proceeding use of the supervised functions. The state propagation between the function objects is performed in exactly the same way as in the case of fault coordination of the functions which has been described above.

Figure 24:
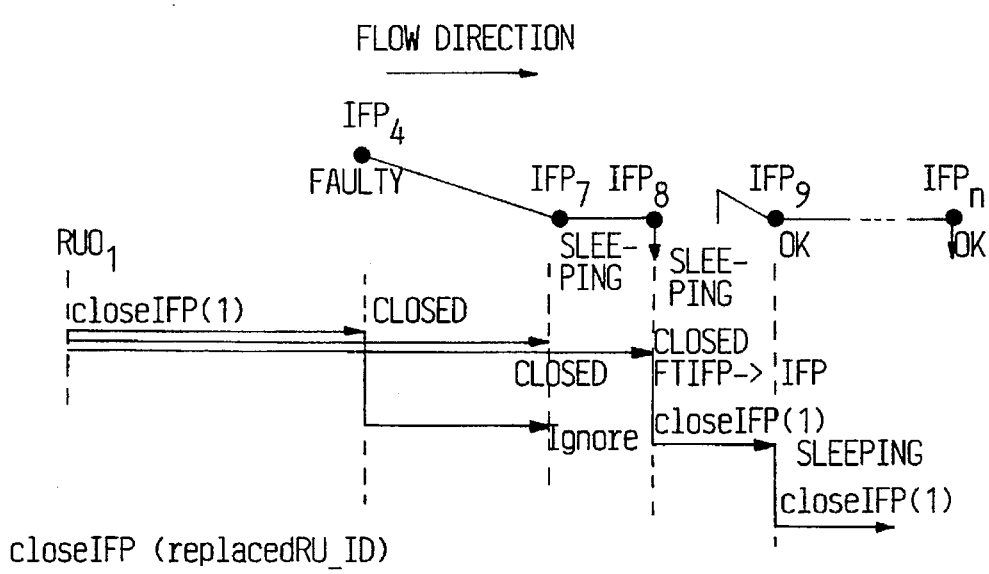
FIG. 24 illustrates an example of termination of replaceable units.

The termination request is implemented by a method call closeIFP, cf. FIG. 24. It can be noted that $IFP_8$ is changed to a "normal" IFP when it enters the transparent state. $IFP_9$ enters the state SLEEPING due to a method call closeIFP being received with a RU identifier which is not similar to its own RU association.

Before a unit is taken into operation a starting or acceptance test is performed of the unit itself. The starting test is a built-in selftesting function which is only performed once at start. This test can be regarded as a pure hardware function and is not included in the software model. The test can, however, be controlled and supervised by the local processor controlling the unit.

Before the new unit is taken into operation the selftest has to be carried through without problems.

For the description of how a replaceable unit is taken into operation it can be assumed that the control connection to the application program responsive for the hardware supervision in the local processor has been re-established.

All inference points IFP affected by this repair activity are informed about the installation of the new hardware unit RU. Thereupon the inference points will start their supervision. Inference points indirectly connected to the replaceable unit RU are informed by state propagation along the influence graph, in exactly the same way as when the replaceable unit was terminated. The request regarding start is performed in form of the method call openIFP.

As soon as an IFP has started its supervision, use is admitted of the function objects FO which are supervised by this inference point. If the function is supervised by more inference points they must wait until permission has been received from all inference points.

What is claimed is:

1. A fault supervision and management system in a telecommunication system, comprising:

a chain system of diagnose and inference data entities interconnected one after the other in a fault propagation direction in the telecommunication system, wherein the data entities supervise, in a respective supervision domain, one phenomenon each, which may be caused by faults in the telecommunication system, and communicate with, affect, and interact with each other in case of emergence of a fault, for localizing faults in the telecommunication system;

one or more measurement point data entities for observing the emergence of the phenomena supervised by the diagnose and inference data entities, and reporting to the diagnose and inference data entities; and a measurement combinatory data entity for collecting and processing data, wherein said measurement point data entities can be grouped to the measurement combinatory data entity;

wherein a diagnose and inference data entity that has detected the presence of a fault in the chain system, before having established whether the fault has arisen in its own supervision domain, sends a fault localize request to diagnose and inference data entities located before this fault detecting data entity in the chain system, as seen in the fault propagation direction, requesting them to send in return an acknowledgment message as to whether they have also detected a fault or not; and each diagnose and inference data entity has a fault sequence number associated therewith, which is stepped up by one when a fault has been detected by the associated diagnose and inference data entity, said sequence number being introduced as a parameter in the fault localize request and being stored together with an identity of an associated fault localize requesting diagnose and inference data entity along the associated chain system, the stored information forming an indication that upstream branches have already been investigated and that acknowledgment can be sent downstream immediately.

2. A system according to claim 1, in which, before an acknowledgement message is returned, the acknowledgement messages in each upstream branch must have been received.

3. A system according to claim 1, in which the identity parameter is returned by the acknowledgement message.

4. A fault supervision and management system in a telecommunication system, comprising:

a chain system of diagnose and inference data entities interconnected one after the other in a fault propagation direction in the telecommunication system, wherein the data entities supervise, in a respective supervision domain, one phenomenon each, which may be caused by faults in the telecommunication system, and communicate with, affect, and interact with each other in case of emergence of a fault, for localizing faults in the telecommunication system;

one or more measurement point data entities for observing the emergence of the phenomena supervised by the diagnose and inference data entities, and reporting to the diagnose and inference data entities; and a measurement combinatory data entity for collecting and processing data, wherein said measurement point data entities can be grouped to the measurement combinatory data entity;

wherein a diagnose and inference data entity that has detected the presence of a fault in the chain system, before having established whether the fault has arisen in its own supervision domain, sends a fault localize request to diagnose and inference data entities located before this fault detecting data entity in the chain system, as seen in the fault propagation direction, requesting them to send in return an acknowledgment message as to whether they have also detected a fault or not; if a chain system includes several parallel branches for the fault detecting diagnose and inference data entity, a search is performed in parallel in upstream branches; information regarding the branch having been passed by the request is added to a parameter list for the fault localize request; and the parameters are implemented as a stack to which each diagnose and inference data entity sending a localize request adds its own identity.

5. A system according to claim 4, in which the sending diagnose and inference data entity keeps track of outstanding localize requests by means of a counter and by saving the identity of the request.

6. A system according to claim 4, in which each time an acknowledgement is sent, an updating operation is performed on the stack.

7. A fault supervision and management system in a telecommunication system, comprising:

a chain system of diagnose and inference data entities interconnected one after the other in a fault propagation direction in the telecommunication system, wherein the data entities supervise, in a respective supervision domain, one phenomenon each, which may be caused by faults in the telecommunication system, and communicate with, affect, and interact with each other in case of emergence of a fault, for localizing faults in the telecommunication system;

one or more measurement point data entities for observing the emergence of the phenomena supervised by the diagnose and inference data entities, and reporting to the diagnose and inference data entities; and a measurement combinatory data entity for collecting and processing data, wherein said measurement point data entities can be grouped to the measurement combinatory data entity;

wherein a diagnose and inference data entity that has detected the presence of a fault in the chain system, before having established whether the fault has arisen in its own supervision domain, sends a fault localize request to diagnose and inference data entities located before this fault detecting data entity in the chain system, as seen in the fault propagation direction, requesting them to send in return an acknowledgment message as to whether they have also detected a fault or not; and a diagnose and inference data entity, as soon as having established that a detected fault is within its domain, sends a coordination method call to all diagnose and inference data entities located downstream in the fault propagation direction, said method call being passed on until a fault terminating diagnose and inference data entity has been found.

8. A system according to claim 7, in which an identity of the sending diagnose and inference data entity follows the coordination method call and is stored by diagnose and inference data entities being passed by the call.

9. A fault supervision and management system in a telecommunication system, comprising:

a chain system of diagnose and inference data entities interconnected one after the other in a fault propagation direction in the telecommunication system, wherein the data entities supervise, in a respective supervision domain, one phenomenon each, which may be caused by faults in the telecommunication system, and communicate with, affect, and interact with each other in case of emergence of a fault, for localizing faults in the telecommunication system;

one or more measurement point data entities for observing the emergence of the phenomena supervised by the diagnose and inference data entities, and reporting to the diagnose and inference data entities; and a measurement combinatory data entity for collecting and processing data, wherein said measurement point data entities can be grouped to the measurement combinatory data entity;

wherein a diagnose and inference data entity that has detected the presence of a fault in the chain system, before having established whether the fault has arisen in its own supervision domain, sends a fault localize request to diagnose and inference data entities located before this fault detecting data entity in the chain system, as seen in the fault propagation direction, requesting them to send in return an acknowledgment message as to whether they have also detected a fault or not; and when a fault has been taken care of, the disappearance of the fault is detected by the diagnose and inference data entity that originally detected the fault, said data entity sending a method call about this to all downstream diagnose and inference data entities, said method call being passed on until a fault terminating diagnose and inference data entity has been found.

10. A system according to claim 9, in which an identity of the diagnose and inference data entity in question follows a message regarding the disappearance of the fault.

11. A system according to claim 10, in which, when a diagnose and inference data entity has received the message regarding the disappearance of the fault, this data entity starts supervision of faults again, after that all diagnose and inference data entities have recovered which have caused the taking out of operation of the diagnose and inference data entity in question.

12. A method for distributed fault handling in a telecommunication system, comprising the steps of:

analyzing flows of data and signals in the telecommunication system for determining the behavior of the system in case of fault emergence and thereby localizing phenomenons which can be caused by faults, representing the behavior by one or more chain systems of diagnose and inference data entities interconnected one after the other in a fault propagation direction in the telecommunication system, determining the location of data entities in their respective chain systems so as to enable each of them to supervise, in a respective supervision domain, one each of those of said phenomenons which appear in such chain system, and to communicate with, affect, and interact with each other in case of a fault, for localizing faults in the telecommunication system, providing one or more measurement point data entities in association with each diagnose and inference data entity for observing the phenomenon supervised by the associated diagnose and inference data entity, and reporting to the diagnose and inference data entity, associating a number of measurement point data entities with a measurement combinatory data entity for collecting and processing data from the measurement point data entities, sending, by a diagnose and inference data entity that has detected a fault in its corresponding chain system and before having established whether the fault has arisen in its own supervision domain, a fault localize request to diagnose and inference data entities located before this fault detecting data entity in the chain system, as seen in the fault propagation direction, requesting them to send in return an acknowledgment message as to whether they have also detected a fault or not, associating with each diagnose and inference data entity a fault sequence number, stepping up said number by one when a fault has been detected by the associated diagnose and inference data entity, introducing said sequence number as a parameter in the fault localize request, and storing it together with an identity of an associated fault localize requesting diagnose and inference data entity along the associated chain system for forming, by the information thus stored, an indication that upstream branches have already been investigated and that acknowledgment can be sent downstream immediately.

13. A method according to claim 12, comprising returning an acknowledgement message not until acknowledgement messages have been received from each upstream branch of the chain system.

14. A method according to claim 12, comprising returning the identity parameter by the acknowledgement message.

15. A method for distributed fault handling in a telecommunication system, comprising the steps of:

analyzing flows of data and signals in the telecommunication system for determining the behavior of the system in case of fault emergence and thereby localizing phenomenons which can be caused by faults, representing the behavior by one or more chain systems of diagnose and inference data entities interconnected one after the other in a fault propagation direction in the telecommunication system, determining the location of data entities in their respective chain systems so as to enable each of them to supervise, in a respective supervision domain, one each of those of said phenomenons which appear in such chain system, and to communicate with, affect, and interact with each other in case of a fault, for localizing faults in the telecommunication system, providing one or more measurement point data entities in association with each diagnose and inference data entity for observing the phenomenon supervised by the associated diagnose and inference data entity, and reporting to the diagnose and inference data entity, associating a number of measurement point data entities with a measurement combinatory data entity for collecting and processing data from the measurement point data entities, sending, by a diagnose and inference data entity that has detected the presence of a fault in its corresponding chain system and before having established whether the fault has arisen in its own supervision domain, a fault localize request to diagnose and inference data entities located before this fault detecting data entity in the chain system, as seen in the fault propagation direction, requesting them to send in return an acknowledgment message as to whether they have also detected a fault or not, performing, if a chain system includes several parallel branches for the fault detecting diagnose and inference data entity, a search in parallel in upstream branches, and adding information regarding the branch having been passed by the request to a parameter list for the fault localize request, implementing the parameters as a stack, and adding by each diagnose and inference data entity sending a localize request, its own identity to said stack.

16. A method according to claim 6, in which the sending diagnose and inference data entity keeps track of outstanding localize requests by means of a counter and by storing the identity of the request.

17. A method according to claim 15, performing, each time an acknowledgement is sent, an updating operation on the stack.

18. A method for distributed fault handling in a telecommunication system, comprising the steps of:

analyzing flows of data and signals in the telecommunication system for determining the behavior of the system in case of fault emergence and thereby localizing phenomenons which can be caused by faults, representing the behavior by one or more chain systems of diagnose and inference data entities interconnected one after the other in a fault propagation direction in the telecommunication system, determining the location of data entities in their respective chain systems so as to enable each of them to supervise, in a respective supervision domain, one each of those of said phenomenons which appear in such chain system, and to communicate with, affect, and interact with each other in case of a fault, for localizing faults in the telecommunication system, providing one or more measurement point data entities in association with each diagnose and inference data entity for observing the phenomenon supervised by the associated diagnose and inference data entity, and reporting to the diagnose and inference data entity, associating a number of measurement point data entities with a measurement combinatory data entity for collecting and processing data from the measurement point data entities, sending, by a diagnose and inference data entity that has detected the presence of a fault in its corresponding chain system and before having established whether the fault has arisen in its own supervision domain, a fault localize request to diagnose and inference data entities located before this fault detecting data entity in the chain system, as seen in the fault propagation direction, requesting them to send in return an acknowledgment message as to whether they have also detected a fault or not, sending, by a diagnose and inference data entity, as soon as it has established that a detected fault is within its domain, a certain method call to all diagnose and inference data entities located downstream in the fault propagation direction, and passing on said call until a fault generating diagnose and inference data entity has been found.

19. A method according to claim 18, comprising sending an identity of the sending diagnose and inference data entity together with the coordination method call and storing it by the passed diagnose and inference data entities.

20. A method for distributed fault handling in a telecommunication system, comprising the steps of:

analyzing flows of data and signals in the telecommunication system for determining the behavior of the system in case of fault emergence and thereby localizing phenomenons which can be caused by faults, representing the behavior by one or more chain systems of diagnose and inference data entities interconnected one after the other in a fault propagation direction in the telecommunication system, determining the location of data entities in their respective chain systems so as to enable each of them to supervise, in a respective supervision domain, one each of those of said phenomenons which appear in such chain system, and to communicate with, affect, and interact with each other in case of a fault, for localizing faults in the telecommunication system, providing one or more measurement point data entities in association with each diagnose and inference data entity for observing the phenomenon supervised by the associated diagnose and inference data entity, and reporting to the diagnose and inference data entity, associating a number of measurement point data entities with a measurement combinatory data entity for collecting and processing data from the measurement point data entities, sending, by a diagnose and inference data entity that has detected the presence of a fault in its corresponding chain system and before having established whether the fault has arisen in its own supervision domain, a fault localize request to diagnose and inference data entities located before this fault detecting data entity in the chain system, as seen in the fault propagation direction, requesting them to send in return an acknowledgment message as to whether they have also detected a fault or not, detecting, when a fault has been taken care of, a disappearance of the fault by the diagnose and inference data entity that originally detected the fault, and sending by the same diagnose and inference data entity a method call about this to all downstream diagnose and inference data entities until a fault terminating diagnose and inference data entity has been found.

21. A method according to claim 20, comprising sending an identity of the diagnose and inference data entity in question together with a message regarding the disappearance of the fault.

22. A method according to claim 21, comprising starting by a diagnose and inference data entity, that has received a message regarding the disappearance of the fault, supervision of faults again after recovery of all diagnose and inference data entities having caused the taking out of operation of this diagnose and inference data entity.

23. A method for distributed fault handling in a telecommunication system, comprising the steps of:

analyzing flows of data and signals in the system for determining behavior of the system in case of faults and thereby localizing phenomena that can be caused by faults, representing the behavior by one or more chain systems of diagnose and inference data entities interconnected one after the other in a fault propagation direction in the telecommunication system, determining locations of diagnose and inference data entities in their respective chain systems so that each is enabled to supervise, in a respective supervision domain, one each of the phenomena that appear in their respective chain system, and to communicate with, affect, and interact with each other in case of a fault, for localizing faults in the telecommunication system, providing one or more measurement point data entities in association with each diagnose and inference data entity for observing the phenomenon supervised by the associated diagnose and inference data entity, and reporting to the diagnose and inference data entity, sending, by a diagnose and inference data entity that has detected a fault in its corresponding chain system and before having established whether the fault has arisen in its own supervision domain, a fault localize request to diagnose and inference data entities located before this fault detecting data entity in the chain system, as seen in the fault propagation direction, requesting them to send in return an acknowledgment message as to whether they have also detected a fault or not, and detecting, when a fault has been remedied, disappearance of the fault by the diagnose and inference data entity that originally detected the fault, and sending by the same diagnose and inference data entity a method call about the disappearance to all downstream diagnose and inference data entities until a fault terminating diagnose and inference data entity has been found.

* * * * *